US012529981B2

(12) United States Patent
Nishiyama

(10) Patent No.: US 12,529,981 B2
(45) Date of Patent: Jan. 20, 2026

(54) TONER CARTRIDGE INCLUDING CASING HAVING OPENING AND SHUTTER

(71) Applicant: BROTHER KOGYO KABUSHIKI KAISHA, Nagoya (JP)

(72) Inventor: Hideshi Nishiyama, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/932,289

(22) Filed: Oct. 30, 2024

(65) Prior Publication Data

US 2025/0189909 A1 Jun. 12, 2025

Related U.S. Application Data

(63) Continuation of application No. 18/403,922, filed on Jan. 4, 2024, now Pat. No. 12,169,377, which is a (Continued)

(30) Foreign Application Priority Data

Mar. 31, 2016 (JP) ................................ 2016-073400

(51) Int. Cl.
*G03G 15/08* (2006.01)

(52) U.S. Cl.
CPC ....... *G03G 15/0886* (2013.01); *G03G 15/087* (2013.01); *G03G 15/0877* (2013.01); (Continued)

(58) Field of Classification Search
CPC ............ G03G 15/0886; G03G 15/087; G03G 15/0877; G03G 15/0867; (Continued)

(56) References Cited

U.S. PATENT DOCUMENTS

| | | | |
|---|---|---|---|
| 5,078,303 | A | 1/1992 | Kikuchi et al. |
| 5,515,143 | A | 5/1996 | Shiotani |

(Continued)

FOREIGN PATENT DOCUMENTS

| | | | |
|---|---|---|---|
| CN | 1113575 | A | 12/1995 |
| CN | 1881102 | | 12/2006 |

(Continued)

OTHER PUBLICATIONS

May 9, 2017—(WO) International Search Report & Written Opinion—App PCT/JP2017/012338, Eng Tran.

(Continued)

*Primary Examiner* — Robert B Beatty
(74) *Attorney, Agent, or Firm* — Merchant & Gould P.C.

(57) ABSTRACT

A cartridge includes a shutter that opens and closes when the cartridge is attached and detached to a developing unit or image forming apparatus. The cartridge includes a casing having a chamber with a first opening at one end portion allowing toner to flow out of the casing. The cartridge includes a cover that covers the first opening, movable with the casing and having a second opening allowing toner to flow out of the cover. The shutter is located at the one end portion and has a protrusion further from the one end portion than the cover. The developing unit supports the protrusion when the cartridge is mounted thereon, and the casing pivots with the cover relative to the developing unit between a first position where the shutter closes the second opening and a second position where a third opening of the shutter overlaps the second opening.

7 Claims, 23 Drawing Sheets

Related U.S. Application Data continuation of application No. 18/169,250, filed on Feb. 15, 2023, now Pat. No. 11,940,743, which is a continuation of application No. 17/557,360, filed on Dec. 21, 2021, now Pat. No. 11,609,508, which is a continuation of application No. 17/061,773, filed on Oct. 2, 2020, now Pat. No. 11,209,751, which is a continuation of application No. 16/734,823, filed on Jan. 6, 2020, now Pat. No. 10,838,320, which is a continuation of application No. 16/537,782, filed on Aug. 12, 2019, now Pat. No. 10,527,968, which is a continuation of application No. 16/171,006, filed on Oct. 25, 2018, now Pat. No. 10,409,197, which is a continuation of application No. 15/473,781, filed on Mar. 30, 2017, now Pat. No. 10,126,681.

(52) U.S. Cl.
CPC ............... *G03G 2215/0663* (2013.01); *G03G 2215/0668* (2013.01); *G03G 2215/067* (2013.01); *G03G 2215/0692* (2013.01)

(58) Field of Classification Search
CPC ..... G03G 2215/0668; G03G 2215/067; G03G 2215/0692; G03G 2215/0663
See application file for complete search history.

(56) References Cited

U.S. PATENT DOCUMENTS

| | | | |
|---|---|---|---|
| 7,389,067 | B2 | 6/2008 | Okamoto et al. |
| 8,862,036 | B2 | 10/2014 | Maeshima |
| 2004/0208675 | A1 | 10/2004 | Horikoshi et al. |
| 2006/0104673 | A1 | 5/2006 | Sasae et al. |
| 2007/0217826 | A1 | 9/2007 | Koyama |
| 2007/0223970 | A1 | 9/2007 | Kawai |
| 2007/0269238 | A1 | 11/2007 | Sato |
| 2008/0253803 | A1 | 10/2008 | Nittani et al. |
| 2009/0129813 | A1 | 5/2009 | Nagashima et al. |
| 2009/0257785 | A1 | 10/2009 | Okuda et al. |
| 2010/0202803 | A1 | 8/2010 | Sato et al. |
| 2010/0329734 | A1 | 12/2010 | Hayakawa et al. |
| 2011/0076056 | A1 | 3/2011 | Sato |
| 2011/0182613 | A1 | 7/2011 | Kamimura et al. |
| 2012/0020704 | A1 | 1/2012 | Nishiyama |
| 2012/0087694 | A1 | 4/2012 | Itabashi |
| 2012/0219318 | A1 | 8/2012 | Yoshida et al. |
| 2013/0051833 | A1 | 2/2013 | Itabashi et al. |
| 2013/0084099 | A1 | 4/2013 | Hashimoto et al. |
| 2013/0170864 | A1 | 7/2013 | Newman et al. |
| 2013/0259532 | A1 | 10/2013 | Kubota et al. |
| 2013/0259534 | A1 | 10/2013 | Maeshima |
| 2013/0272750 | A1 | 10/2013 | Matsumoto et al. |
| 2013/0287425 | A1 | 10/2013 | Koyama |
| 2014/0050507 | A1 | 2/2014 | Hamada et al. |
| 2014/0086640 | A1 | 3/2014 | Okabe |
| 2014/0161491 | A1 | 6/2014 | Fukushima |
| 2014/0286679 | A1 | 9/2014 | Nakamura |
| 2014/0376971 | A1 | 12/2014 | Tanaka |
| 2015/0016847 | A1 | 1/2015 | Tsuchiya |
| 2015/0030355 | A1 | 1/2015 | Eto et al. |
| 2016/0313674 | A1 | 10/2016 | Eto |
| 2017/0285528 | A1 | 10/2017 | Nishiyama et al. |
| 2017/0285529 | A1 | 10/2017 | Nishiyama |
| 2017/0285530 | A1 | 10/2017 | Nishiyama et al. |
| 2018/0059576 | A1* | 3/2018 | Nishiyama ......... G03G 15/0886 |
| 2020/0103788 | A1* | 4/2020 | Furukawa .......... G03G 15/0868 |
| 2022/0155706 | A1* | 5/2022 | Furukawa .......... G03G 21/1814 |

FOREIGN PATENT DOCUMENTS

| | | | |
|---|---|---|---|
| CN | 101038466 | A | 9/2007 |
| CN | 101114145 | A | 1/2008 |
| CN | 101231496 | | 7/2008 |
| CN | 101286035 | A | 10/2008 |
| CN | 101556452 | A | 10/2009 |
| CN | 102033462 | A | 4/2011 |
| CN | 102073244 | A | 5/2011 |
| CN | 102135739 | A | 7/2011 |
| CN | 202472243 | U | 10/2012 |
| CN | 102968022 | A | 3/2013 |
| CN | 103238118 | | 8/2013 |
| CN | 103698989 | | 4/2014 |
| CN | 103809414 | | 5/2014 |
| CN | 103869660 | | 6/2014 |
| CN | 107272373 | | 10/2017 |
| EP | 1 041 453 | | 10/2000 |
| JP | S60-130772 | A | 7/1985 |
| JP | S60-138578 | A | 7/1985 |
| JP | H03-196074 | A | 8/1991 |
| JP | 10-105018 | A | 4/1998 |
| JP | 10-198145 | | 7/1998 |
| JP | 2008-134409 | | 6/2008 |
| JP | 2009-175760 | A | 8/2009 |
| JP | 2011-013367 | A | 1/2011 |
| JP | 2012-083395 | A | 4/2012 |
| JP | 2013-161091 | A | 8/2013 |
| JP | 2015018191 | A | 1/2015 |
| JP | 2015-64447 | A | 4/2015 |
| WO | 2007/105375 | | 9/2007 |
| WO | 2012/074139 | A1 | 6/2012 |
| WO | 2013/015455 | | 1/2013 |

OTHER PUBLICATIONS

Feb. 15, 2018—(SG) Written Opinion—SG App. No. 10201702465R.
Extended European Search Report issued in counterpart European Patent Application No. 17774905.8, Oct. 9, 2019.
Office Action issued in corresponding European Patent Application No. 17774905.8, Jul. 27, 2020.
Office Action issued in corresponding Chinese Patent Application No. 201710199636.7, Sep. 23, 2020.
Notice of Allowance issued in corresponding Chinese Patent Application No. 201710199636.7, May 8, 2021.
Extended European Search Report issued in corresponding European Patent Application No. 21176190.3, Sep. 13, 2021.
Office Action issued in corresponding Chinese Patent Application No. 202110828975.3, Jul. 25, 2023.
Office Action in counterpart Chinese application 202110828975.3, Jan. 20, 2024.

* cited by examiner

TONER CARTRIDGE INCLUDING CASING HAVING OPENING AND SHUTTER

CROSS-REFERENCE TO RELATED APPLICATION

This application is a continuation of U.S. patent application Ser. No. 18/403,922, filed Jan. 4, 2024, which is a continuation of U.S. patent application Ser. No. 18/169,250, filed Feb. 15, 2023, now U.S. Pat. No. 11,940,743, which is a continuation of U.S. patent application Ser. No. 17/557,360, filed Dec. 21, 2021, now U.S. Pat. No. 11,609,508, which is a continuation of U.S. patent application Ser. No. 17/061,773, filed Oct. 2, 2020, now U.S. Pat. No. 11,209,751, which is a continuation of U.S. patent application Ser. No. 16/734,823, filed Jan. 6, 2020, now U.S. Pat. No. 10,838,320, which is a continuation of U.S. patent application Ser. No. 16/537,782, filed Aug. 12, 2019, now U.S. Pat. No. 10,527,968, which is a continuation of U.S. patent application Ser. No. 16/171,006 filed Oct. 25, 2018, now U.S. Pat. No. 10,409,197 on Sep. 10, 2019, which is a continuation of U.S. patent application Ser. No. 15/473,781 filed Mar. 30, 2017, now U.S. Pat. No. 10,126,681, which application claims priority from Japanese Patent Application No. 2016-073400, filed Mar. 31, 2016. The contents of the above noted applications are incorporated herein by reference in their entirety.

FIELD OF DISCLOSURE

The disclosure relates to a toner cartridge.

BACKGROUND

A known toner cartridge is configured to be attached and detached relative to an image forming apparatus. The toner cartridge contains toner.

The toner cartridge has a toner outlet and a shutter configured to open and close the outlet. The shutter is rotatable between an open position in which the outlet is open, and a closed position in which the outlet is closed. The image forming apparatus includes a lever for rotating the shutter. A user operation of the lever, after the toner cartridge is mounted on the image forming apparatus, causes the shutter to rotate.

SUMMARY

One or more aspects of the disclosure provide a toner cartridge including a shutter configured to open and close in response to a user operation of attaching and detaching the toner cartridge relative to a developing unit or an image forming apparatus.

DETAILED DESCRIPTION

1. General Structure of Toner Cartridge 1

A general structure of a toner cartridge 1 is described below.

Figure 1:
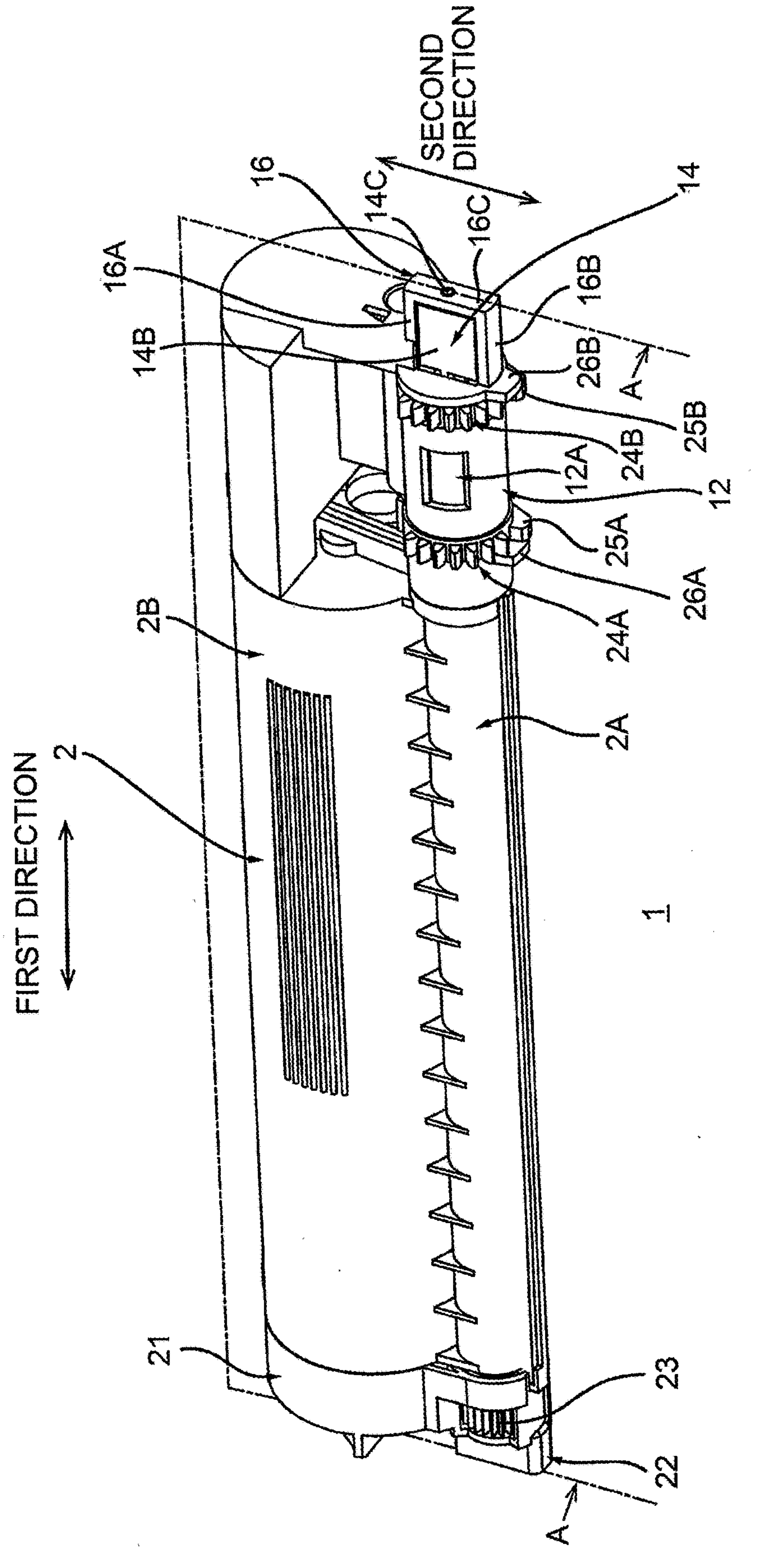
FIG. 1 is a perspective view of a toner cartridge 1 in an illustrative embodiment according to one or more aspects of the disclosure.
Figure 10:
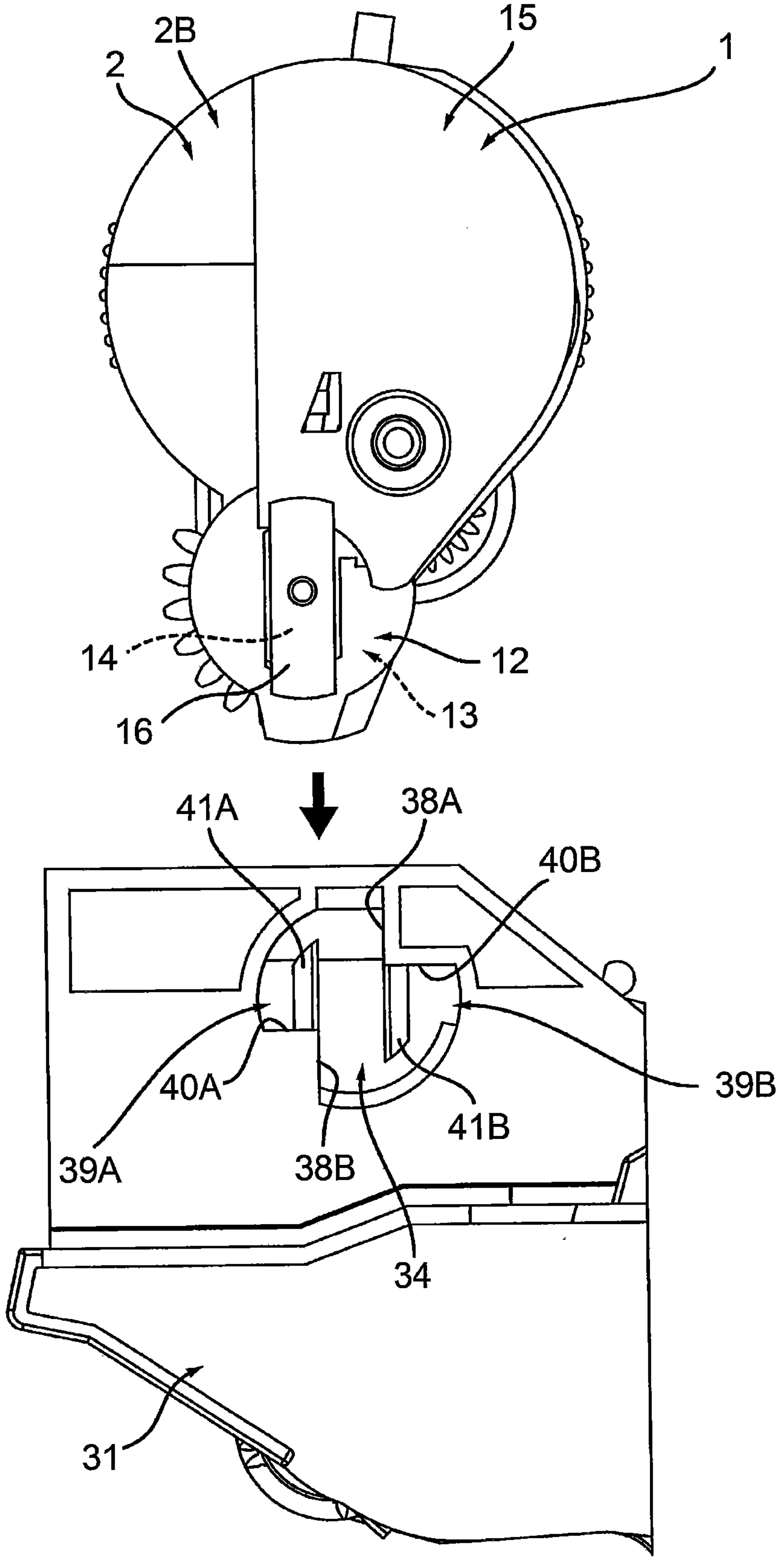
FIG. 10 depicts a process of mounting the toner cartridge 1 to the developing unit 31, illustrating the toner cartridge 1 before being mounted to the developing unit 31.
Figure 11:
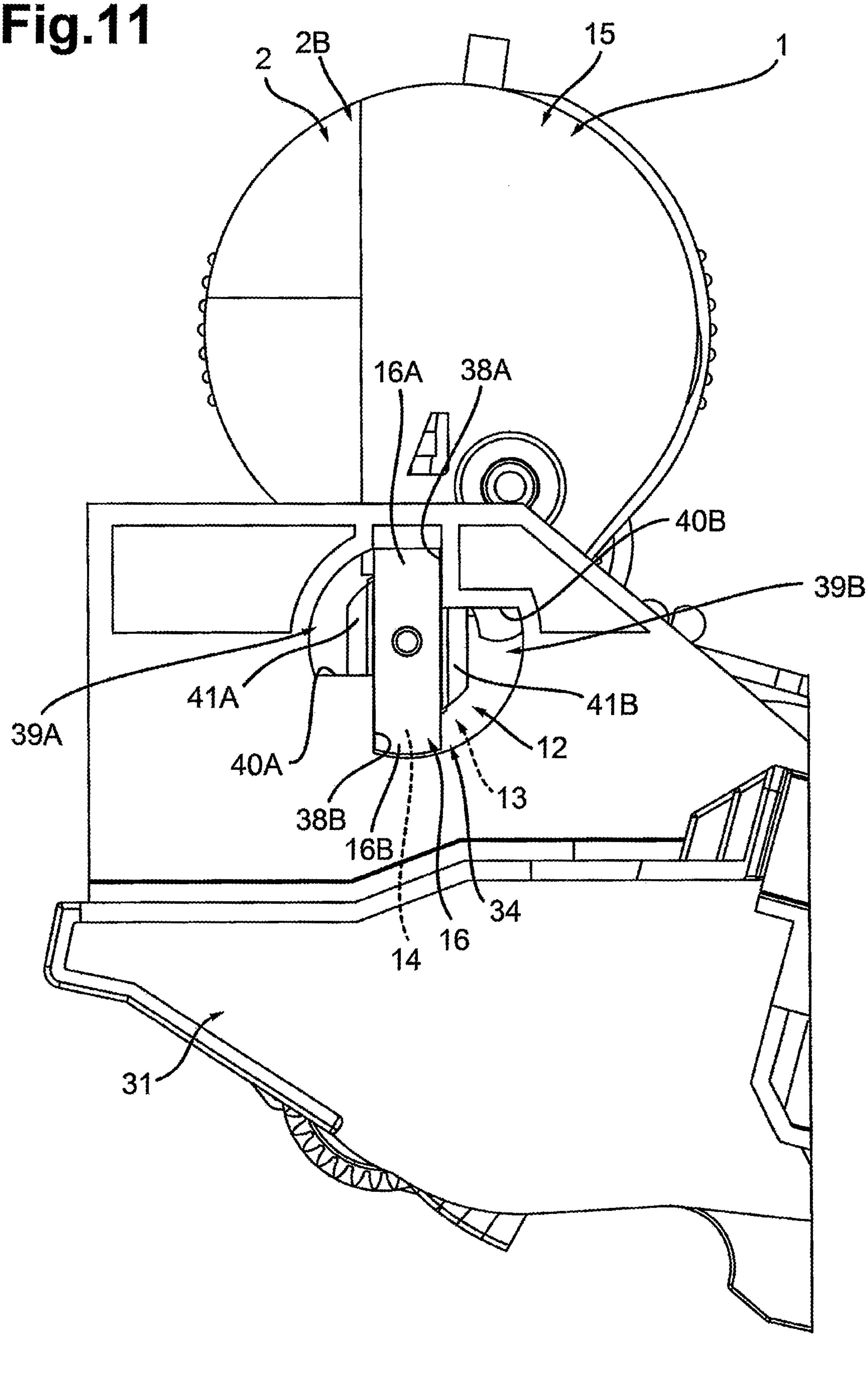
FIG. 11 depicts a process of mounting the toner cartridge 1 to the developing unit 31, illustrating the toner cartridge 1 fully mounted on the developing unit 31, and the casing 2 at the first position.
Figure 21:
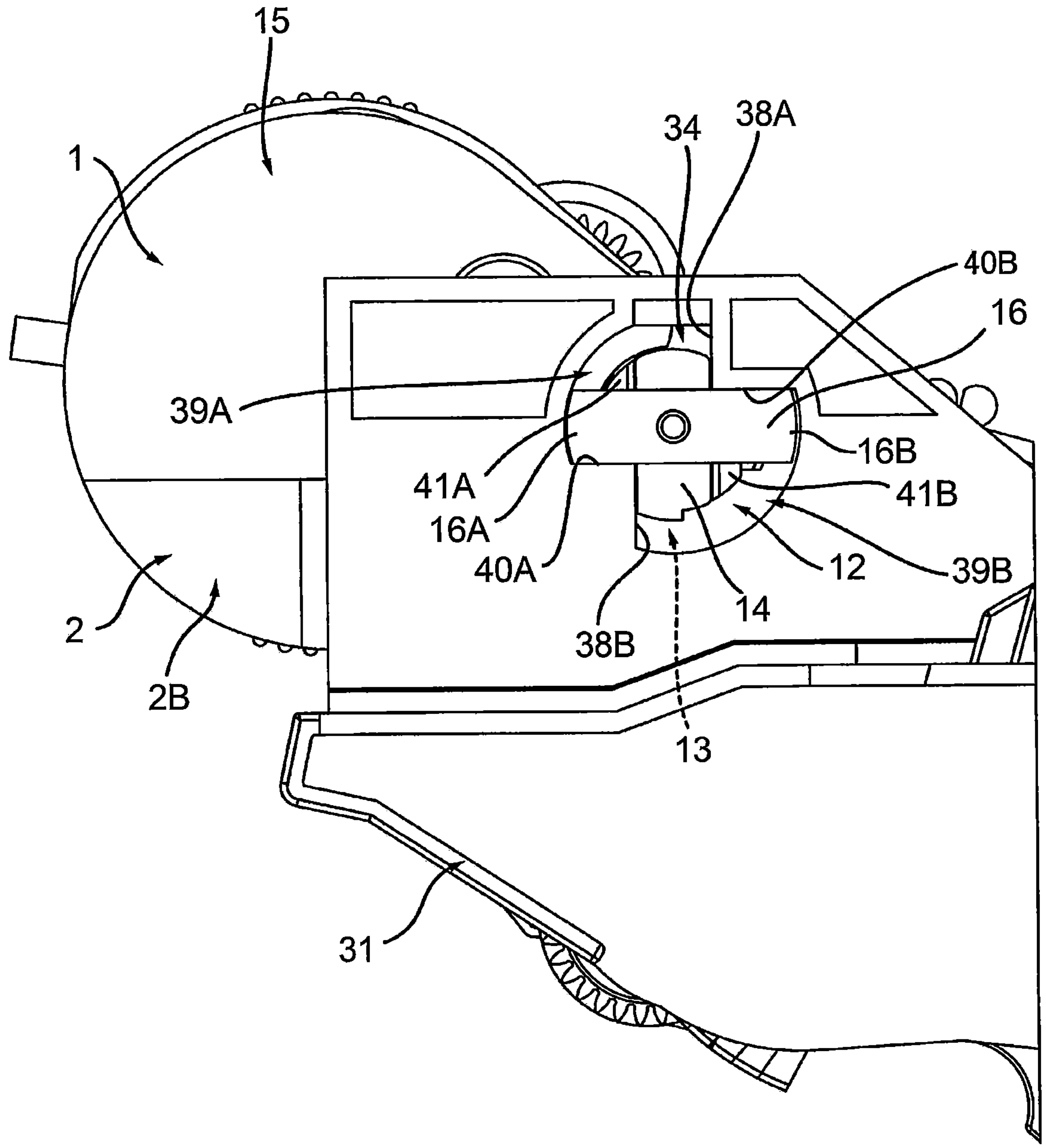
FIG. 21 is a side view of the developing unit 31 and the toner cartridge 1, wherein the casing 2 is at the second position.

As depicted in FIG. 1, the toner cartridge 1 is configured to contain toner. As will be described in detail later, the toner cartridge 1 is configured to be mounted to a developing unit 31 (described below), as depicted in FIGS. 10 and 11. After being mounted, the toner cartridge 1 may pivot relative to the developing unit 31 from a state as depicted in FIG. 11 to a state as depicted in FIG. 21. The toner cartridge 1 is thus attached to the developing unit 31. The toner cartridge 1, which has been attached to the developing unit 31, enables toner supply to the developing unit 31. The toner cartridge 1 pivots about an axis (e.g., a first axis A1 to be described below) provided at an end portion thereof in a second direction as labelled in the relevant drawings.

Figure 2:
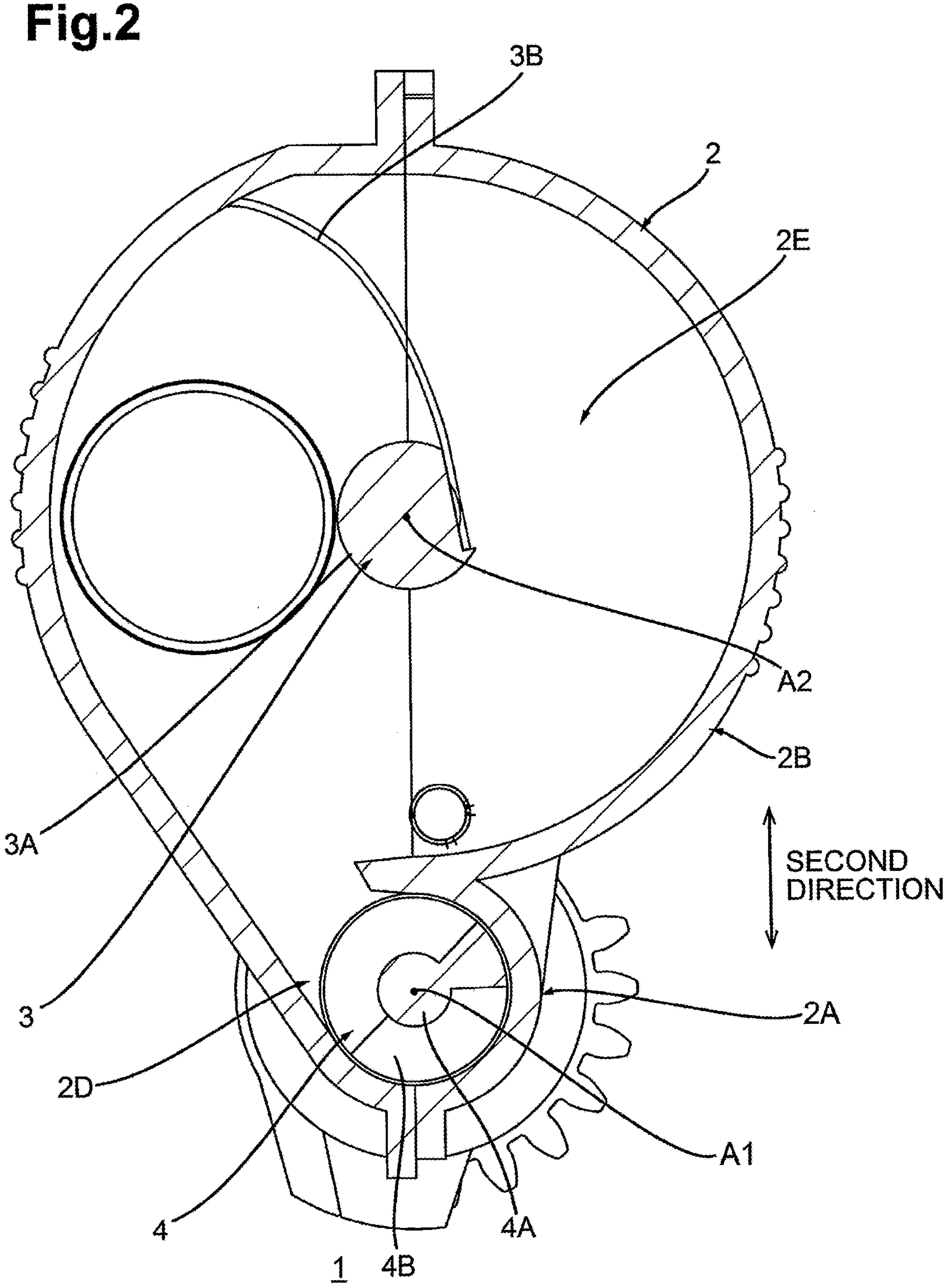
FIG. 2 is a cross-sectional view of the toner cartridge 1.
Figure 3:
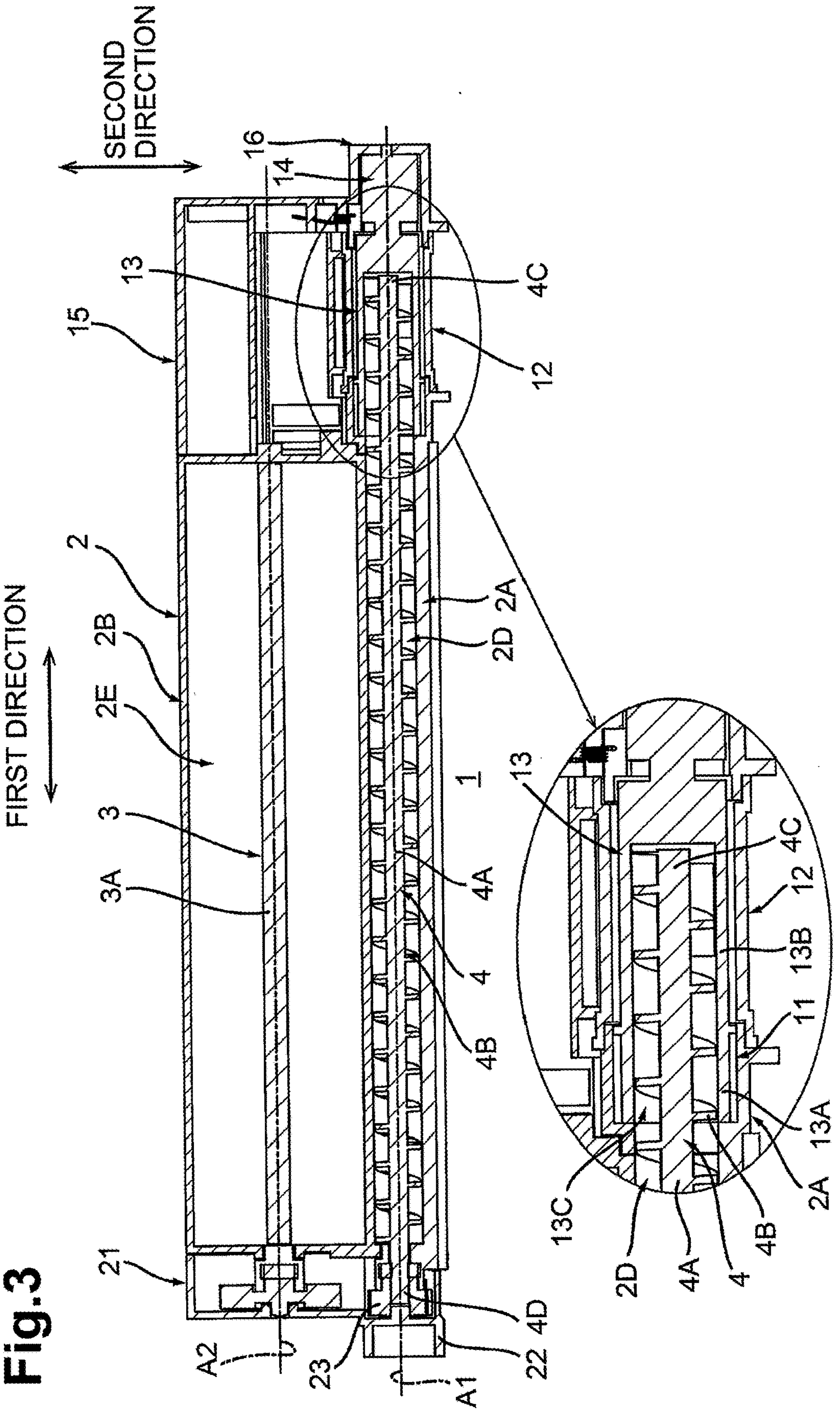
FIG. 3 a cross-sectional view of the toner cartridge 1, taken along a line A-A in FIG. 1.

As depicted in FIGS. 1-3, the toner cartridge 1 includes a casing 2, an agitator 3, and a toner conveyance unit 4.

1.1 Casing 2

The casing 2 extends in a first direction. The casing 2 includes a first toner chamber 2A and a second toner chamber 2B. The second toner chamber 2B is located at one side of the first toner chamber 2A in the second direction. The second direction is defined by connecting a first axis A1 and a second axis A2 to each other. The first toner chamber 2A extends in the first direction and has a cylindrical shape. The first toner chamber 2A has a first interior space 2D for storing toner. The second toner chamber 2B extends in the first direction and has a cylindrical shape. The outside diameter of the second toner chamber 2B is greater than that of the first toner chamber 2A. The second toner chamber 2B has a second interior space 2E, which is aligned with the first interior space 2D in the second direction. The second interior space 2E communicates with the first interior space 2D. The second interior space 2E has an inner capacity greater than that of the first interior space 2D. The inside diameter of a portion of the casing 2 defining the second interior space 2E is greater than that of the portion of the casing 2 defining the first interior space 2D. The first toner chamber 2A and the second toner chamber 2B may be integrally formed. Alternatively, the first toner chamber 2A and the second toner chamber 2B, which are separate members, may be assembled into one unit. With the toner cartridge 1 mounted on the developing unit 31, the casing 2 is pivotable relative to the developing unit 31 between a first position (refer to FIG. 11) and a second position (refer to FIG. 21).

1.2 Toner Conveyance Unit 4

The toner conveyance unit 4 is located inside the first interior space 2D. As will be described in detail later, the toner conveyance unit 4 is configured to convey the toner in the first interior space 2D to a second opening 12A (described below). The toner conveyance unit 4 extends in the first direction. The toner conveyance unit 4 is rotatable about the first axis A1 extending in the first direction. The toner conveyance unit 4 includes, for example, an auger screw. More specifically, the toner conveyance unit 4 includes a shaft 4A and a helical portion 4B. The shaft 4A extends along the first axis A1. The helical portion 4B protrudes or extends from the shaft 4A in a radial direction of the first toner chamber 2A. The helical portion 4B helically extends in the first direction. The toner conveyance unit 4 may have a helical shape. The toner conveyance unit 4 is not limited to an auger screw. For example, the toner conveyance unit 4 may include a shaft and a blade extending from the shaft.

1.3 Agitator 3

The agitator 3 is located inside the second interior space 2E. The agitator 3 is configured to agitate the toner in the second interior space 2E to allow the toner to be conveyed from the second interior space 2E to the first interior space 2D. The agitator 3 is rotatable about the second axis A2 extending in the first direction. The agitator 3 includes an agitator shaft 3A and a blade 3B. The agitator shaft 3A extends along the second axis A2. The blade 3B extends from the agitator shaft 3A in a radial direction of the second toner chamber 2B. The blade 3B is rotatable together with the agitator shaft 3A. The blade 3B includes a base end connected to the agitator shaft 3A and a distal end farthest from the agitator shaft 3A. The distal end of the blade 3B contacts the inner surface of the second toner chamber 2B. The distal end of the blade 3B contacting the inner surface of the second toner chamber 2B faces upstream in a rotating direction of the agitator 3 and other portion of the blade 3B flexes toward a downstream side in the rotating direction. The agitator 3 agitates the toner in the second interior space 2E by rotating the blade 3B, and conveys the toner from the second interior space 2E to the first interior space 2D.

2. Details of Toner Cartridge 1

Referring to FIGS. 3-7, the toner cartridge 1 is now described in detail.

2.1 First Toner Chamber 2A

Figure 4:
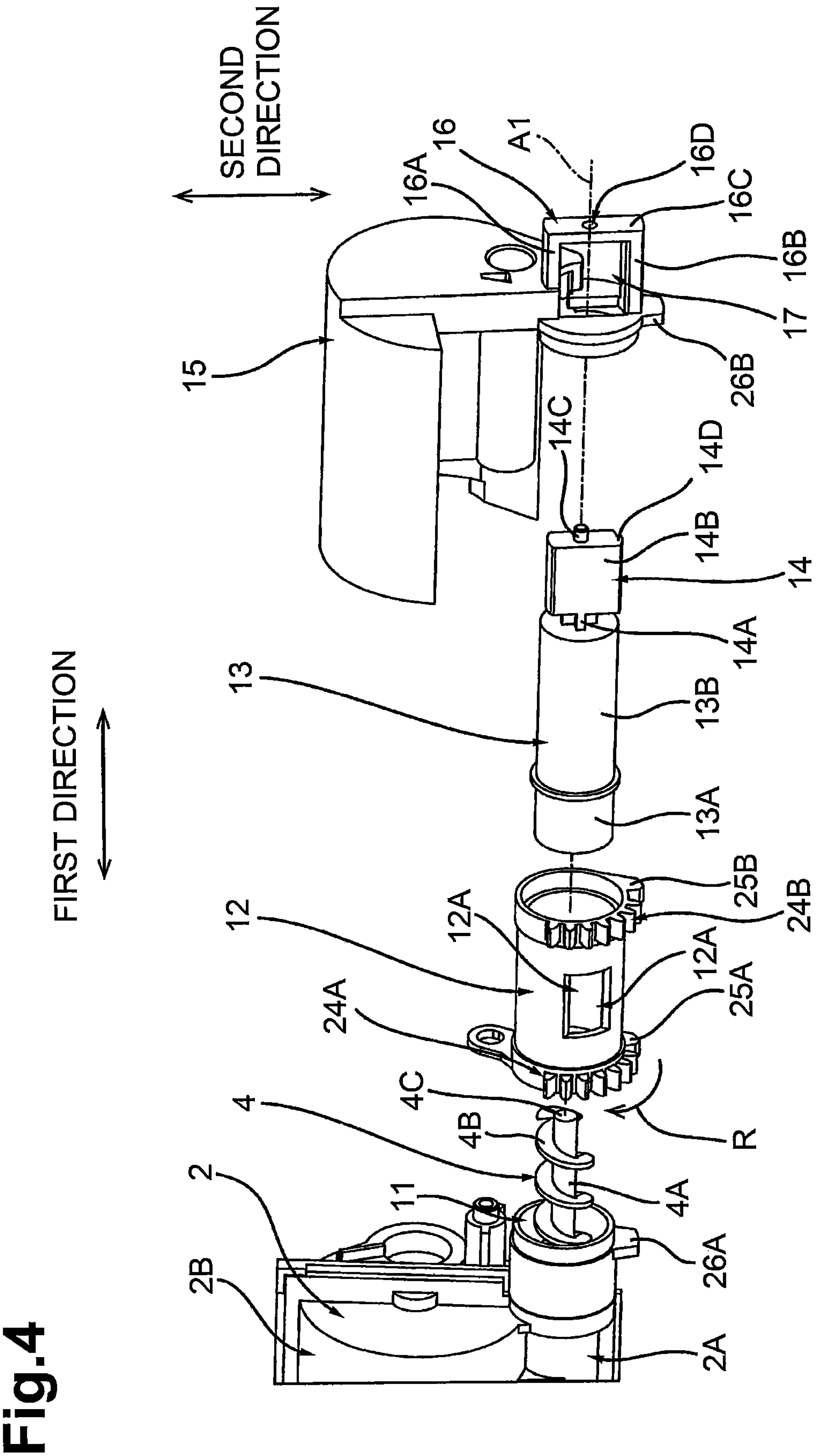
FIG. 4 is an exploded perspective view of an end portion of the toner cartridge 1.

As depicted in FIGS. 3 and 4, the first toner chamber 2A has a first opening 11 at an end portion thereof in the first direction. The end portion of the first toner chamber 2A protrudes further in the first direction relative to a corresponding end portion of the second toner chamber 2B in the first direction. In other words, the first toner chamber 2A is longer than the second toner chamber 2B with respect to the first direction. A portion of the casing 2 defining the second interior space 2E has a shorter length than another portion of the casing 2 defining the first interior space 2D with respect to the first direction. The end portion of the first toner chamber 2A has a cylindrical shape. The end portion of the first toner chamber 2A has the first opening 11 therethrough in the first direction. The first opening 11 communicates with the first interior space 2D. The first opening 11 allows the toner in the first interior space 2D to flow out of the casing 2. The first opening 11 has the toner conveyance unit 4 inserted therein. The toner conveyance unit 4 includes an end portion 4C in the first direction and an opposite end portion 4D opposite to the end portion 4C in the first direction. The end portion 4C of the toner conveyance unit 4 extends through the first opening 11 in the first direction. The toner conveyance unit 4 is configured to convey the toner from the first interior space 2D to the first opening 11. The opposite end portion 4D of the toner conveyance unit 4 has a gear 23 mounted thereon. The gear 23 is rotatable together with the toner conveyance unit 4.

2.2 First Cover 12

As depicted in FIGS. 3 and 4, the toner cartridge 1 further includes a first cover 12.

The first cover 12 is located at an end portion of the first toner chamber 2A. More specifically, the first cover 12 is mounted on the end portion of the first toner chamber 2A. The first cover 12 is movable together with the casing 2. The first cover 12 covers the first opening 11, as well as the end portion 4C of the toner conveyance unit 4. More specifically, the first cover 12 covers a peripheral surface of the end portion 4C. The first cover 12 extends along the peripheral surface of the end portion 4C of the toner conveyance unit 4. In short, the first cover 12 has a cylindrical shape. The first cover 12 extends in the first direction and has a second opening 12A.

Figure 5A:
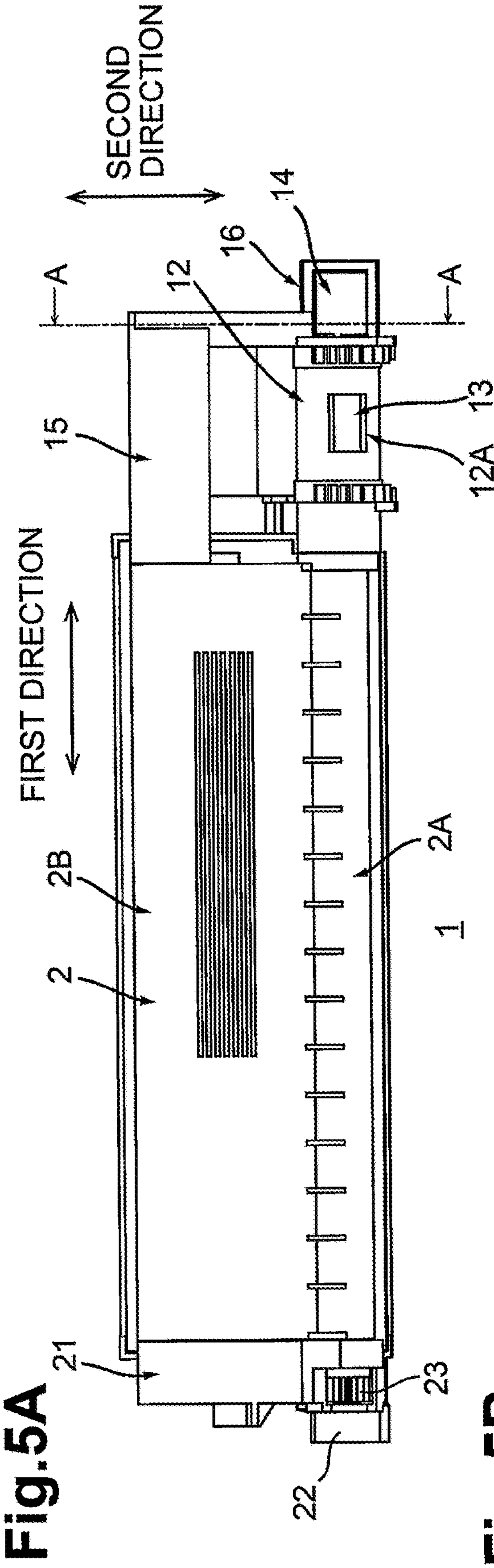
FIG. 5A is a side view of the toner cartridge 1 as viewed from a direction crossing a second direction, wherein a shutter 13 is at a closed position.
Figure 5B:
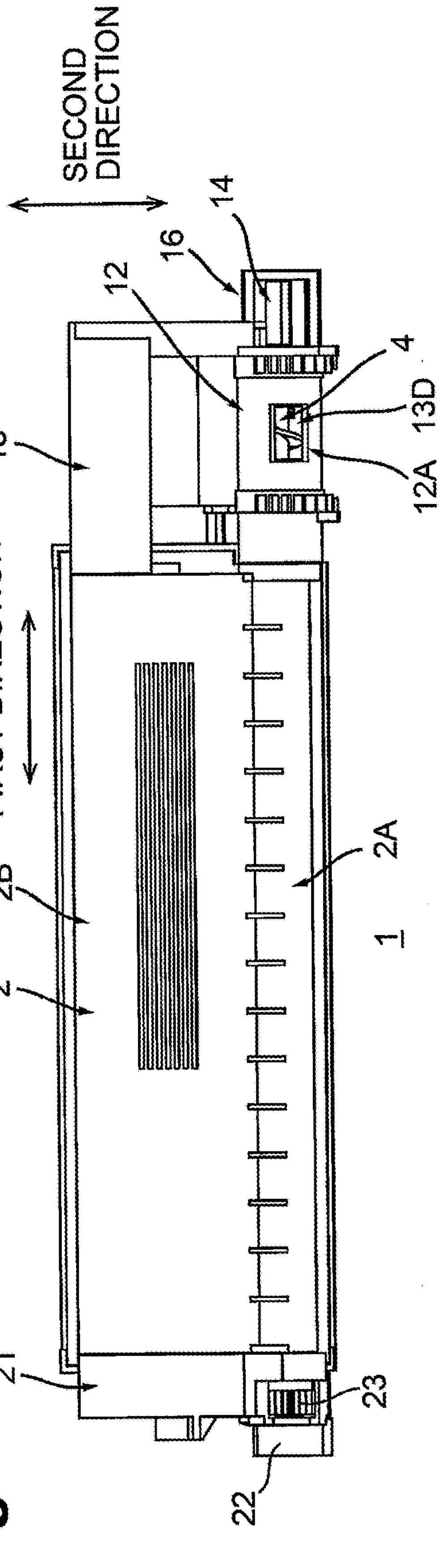
FIG. 5B is a side view of the toner cartridge 1 as viewed from the direction crossing the second direction, wherein the shutter 13 is at an open position.

The second opening 12A is spaced from the first toner chamber 2A, e.g., the first opening 11, in the first direction. The second opening 12A extends through a portion of the peripheral surface of the first cover 12. The second opening 12A allows the toner to flow out of the first cover 12. As depicted in FIG. 5B, the toner conveyance unit 4 extends to the second opening 12A in the first direction. This configuration allows the toner conveyance unit 4 to convey the toner from the first interior space 2D to the second opening 12A, via the first cover 12.

2.3 Shutter 13

As depicted in FIGS. 3 and 4, the toner cartridge 1 further includes a shutter 13.

The shutter 13 is located at an end portion of the first toner chamber 2A. More specifically, the shutter 13 is inserted into both the first cover 12 and the end portion of the first toner chamber 2A. The shutter 13 is thus mounted to the end portion of the first toner chamber 2A. The shutter 13 is rotatable, relative to the casing 2 and the first cover 12, between a closed position (FIG. 5A) and an open position (FIG. 5B). When the casing 2 is at a first position (refer to FIG. 13), the shutter 13 is at the closed position relative to the casing 2 and the first cover 12. When the casing 2 is at a second position (refer to FIG. 22), the shutter 13 is at the open position relative to the casing 2 and the first cover 12.

More specifically, the shutter 13 extends in the first direction. The shutter 13 has one end portion and an opposite end portion. The opposite end portion is further from the first toner chamber 2A than the one end portion in the first direction. The shutter 13 includes an insertion portion 13A and a cover portion 13B. The insertion portion 13A is located at the one end portion of the shutter 13. The insertion portion 13A is inserted into the first opening 11. The insertion portion 13A has an opening 13C therethrough in the first direction. The opening 13C allows the toner in the first interior space 2D to enter an interior space of the shutter 13. The cover portion 13B is aligned with the insertion portion 13A in the first direction. The cover portion 13B is located between the insertion portion 13A and a protrusion 14 (described below) in the first direction. The cover portion 13B protrudes relative to the first opening 11 in the first direction. The cover portion 13B covers a peripheral surface of an end portion (e.g., the end portion 4C) of the toner conveyance unit 4. The cover portion 13B extends along the peripheral surface of the end portion of the toner conveyance unit 4, as well as along an inner surface of the first cover 12. In other words, the first cover 12 extends along a peripheral surface of the cover portion 13B and covers the peripheral surface of the cover portion 13B. More specifically, the cover portion 13B has a cylindrical shape. The cover portion 13B extends in the first direction and includes a third opening 13D (refer to FIG. 5B) extending through a portion of the peripheral surface of the cover portion 13B. A seal S (refer to FIG. 13) is provided around the third opening 13D. The seal S is located between the inner surface of the first cover 12 and the cover portion 13B. The seal S may prevent or reduce the toner from entering into a portion between the inner surface of the first cover 12 and the cover portion 13B. The third opening 13D allows the toner in the interior space of the shutter 13 to flow out of the shutter 13. More specifically, when the shutter 13 is at the closed position as depicted in FIG. 5A, the shutter 13 closes the second opening 12A. When the shutter 13 is at the open position as depicted in FIG. 5B, the third opening 13D at least partially overlaps the second opening 12A, e.g., at least a portion of the third opening 13D overlaps at least a portion of the second opening 12A. The third opening 13D allows the toner in the interior space of the shutter 13 to flow out of the first cover 12 via the second opening 12A.

As depicted in FIG. 4, the shutter 13 includes the protrusion 14. The protrusion 14 is disposed further from the end portion of the first toner chamber 2A than the first cover 12 in the first direction. The protrusion 14 is located opposite to the insertion portion 13A with respect to the cover portion 13B in the first direction. The protrusion 14 is positioned relative to the developing unit 31 when the toner cartridge 1 is mounted on a developing unit 31 (refer to FIG. 11). In other words, the protrusion 14 is supported by the developing unit 31 when the toner cartridge 1 is mounted on a developing unit 31. The protrusion 14 extends in the first direction from the opposite end portion, e.g., the cover portion 13B, of the shutter 13. This configuration allows the protrusion 14 to rotate together with the shutter 13, relative to the casing 2 and the first cover 12. The protrusion 14 has a base end portion connected to the cover portion 13B, and a distal end portion opposite to the cover portion 13B in the first direction with respect to the base end portion. The protrusion 14 includes a shaft portion 14A, a flat plate portion 14B, and a boss 14C. The shaft portion 14A is located at the base end portion of the protrusion 14. The shaft portion 14A extends from the cover portion 13B in the first direction and connects to the flat plate portion 14B. The flat plate portion 14B is located opposite to the cover portion 13B in the first direction with respect to the shaft portion 14A. The flat plate portion 14B is parallel to the second direction when the shutter 13 is at the closed position. The flat plate portion 14B is longer than the shaft portion 14A with respect to the second direction. The boss 14C is located at the distal end portion of the protrusion 14. The boss 14C is located opposite to the shaft portion 14A in the first direction with respect to the flat plate portion 14B. The boss 14C extends in the first direction from the flat plate portion 14B. The boss 14C extends along the second axis A2 and has a cylindrical shape.

2.4 Second Cover 15

As depicted in FIG. 4, the toner cartridge 1 further includes a second cover 15.

The second cover 15 extends in the first direction. The second cover 15 has one end portion and an opposite end portion. The opposite end portion is further from the casing 2 than the one end portion in the first direction. The one end portion of the second cover 15 is attached to a portion of the casing 2 defining the second toner chamber 2B. The second cover 15 is movable together with the casing 2 and the first cover 12, relative to the shutter 13. The second cover 15 includes a cover portion 16.

The cover portion 16 is located at the opposite end portion of the second cover 15. The cover portion 16 protrudes from the opposite end portion of the second cover 15 in the first direction. The cover portion 16 extends in the second direction. The cover portion 16 has a fourth opening 17 therethrough in a direction crossing the first direction and the second direction. The cover portion 16 includes a first frame 16A, a second frame 16B, and a third frame 16C. The first frame 16A is spaced from the second frame 16B in the second direction. The fourth opening 17 is provided between the first frame 16A and the second frame 16B. The third frame 16C is located opposite to the casing 2 in the first direction with respect to the fourth opening 17. The third frame 16C extends in the second direction. The third frame 16C connects to the first frame 16A and the second frame 16B. The third frame 16C has a through hole 16D therethrough in the first direction.

As depicted in FIGS. 1 and 3, the protrusion 14 is inserted into the cover portion 16 such that the flat plate portion 14B of the protrusion 14 is located between the first frame 16A and the second frame 16B. The flat plate portion 14B of the protrusion 14 is exposed from the fourth opening 17. Each of the first frame 16A and the second frame 16B covers a corresponding edge of the flat plate portion 14B when the shutter 13 is at the closed position. The third frame 16C faces the flat plate portion 14B in the first direction. The third frame 16C covers at least a portion of the distal end portion of the protrusion 14 in the first direction. In other words, the second cover 15 at least partially covers the distal end portion of the protrusion 14. The boss 14C of the protrusion 14 is inserted into the through hole 16D, so that the distal end portion of the protrusion 14 supported by the second cover 15 is allowed to rotate.

Figure 6:
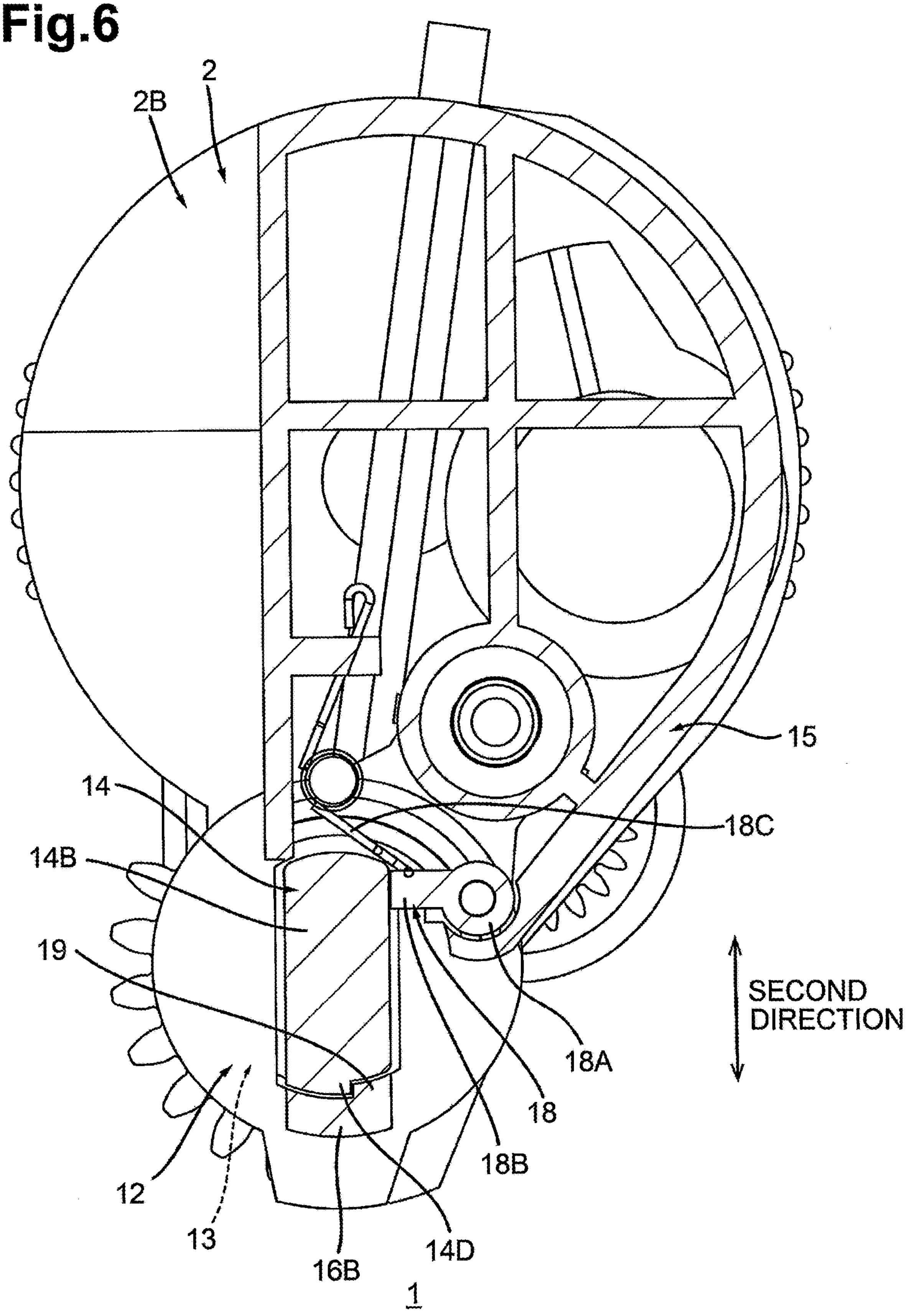
FIG. 6 is a cross-sectional view of the toner cartridge 1 taken along a line A-A in FIG. 5A.

As depicted in FIG. 6, the second cover 15 includes a lock member 18 and a stopper 19.

Figure 12:
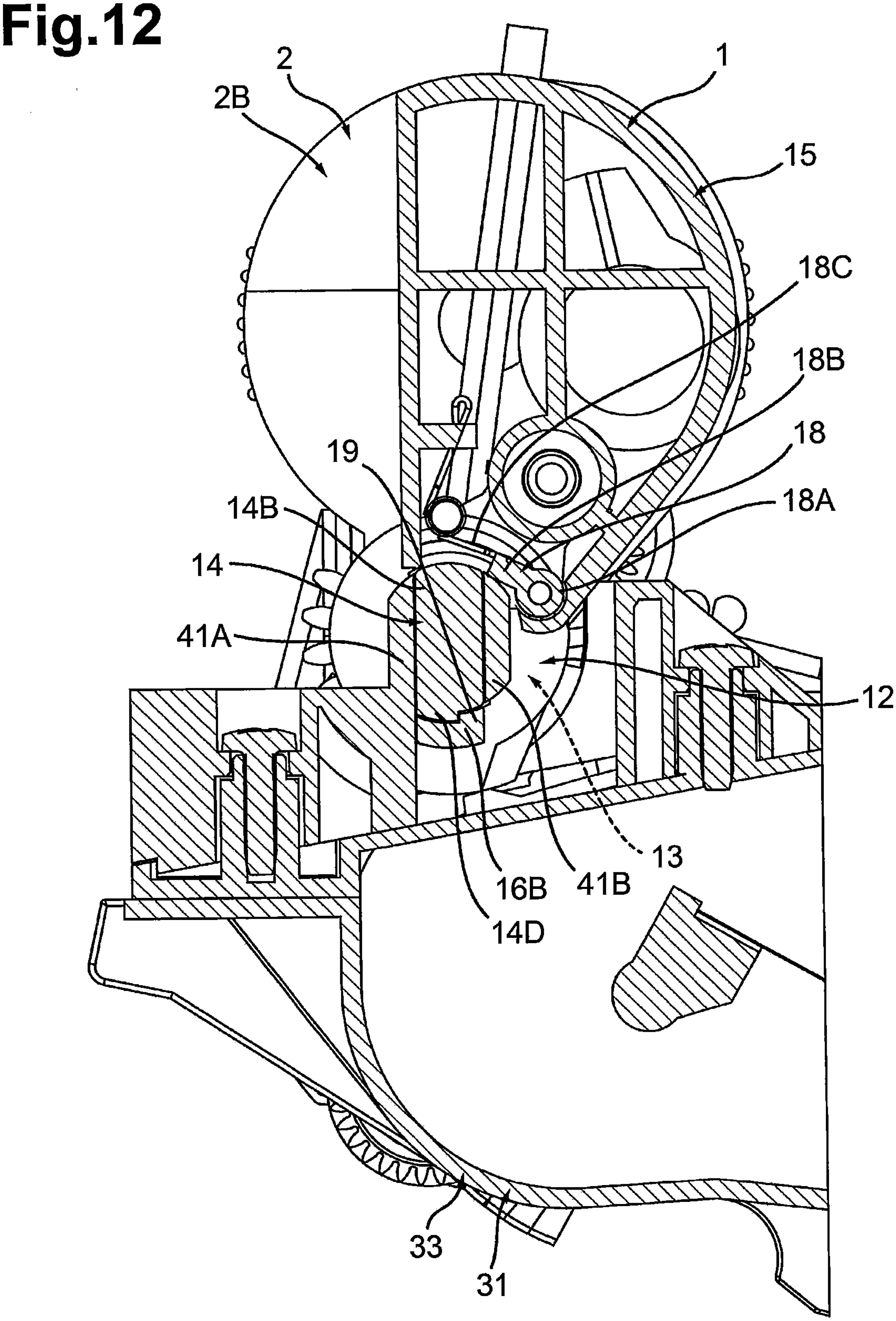
FIG. 12 is a cross-sectional view of the developing unit 31 and the toner cartridge 1 depicted in FIG. 11, taken along a line passing through the lock member 18, wherein the lock member 18 is at an unlock position.

The lock member 18 is movable between a lock position (refer to FIG. 6) and an unlock position (refer to FIG. 12). More specifically, the lock member 18 is pivotable between the lock position and the unlock position. The lock member 18 includes a spring 18C. The lock member 18 is biased or pushed into the lock position by the spring 18C.

The lock member 18 further includes a shaft 18A and a protrusion 18B. The shaft 18A is rotatably supported by the second cover 15. The lock member 18 is pivotable relative to the second cover 15. The protrusion 18B extends from the shaft 18A toward the protrusion 14. The protrusion 18B faces and contacts an end portion of the flat plate portion 14B when the lock member 18 is at the lock position. The end portion of the flat plate portion 14B faces the first frame 16A (refer to FIG. 1) in the second direction when the shutter 13 is at the closed position. At the lock position, the lock member 18 locks the protrusion 14 relative to the second cover 15. Such locking prevents the protrusion 14 from rotating relative to the second cover 15. The lock member 18 locks the protrusion 14 relative to the second cover 15 in a state in which the toner cartridge 1 is separated relative to the developing unit 31 (described below), to prevent the shutter 13 from moving from the closed position to the open position. When the lock member 18 is at the unlock position, the protrusion 18B does not contact the end portion of the flat plate portion 14B. The lock member 18 thus unlocks the protrusion 14 relative to the second cover 15 at the unlock position.

The spring 18C may be a coiled spring. More specifically, the spring 18C has one end portion, an opposite end portion remote from and opposite to the one end portion, and a coiled portion between the one end portion and the opposite end portion. The one end portion of the spring 18C contacts the second cover 15. The opposite end portion of the spring 18C contacts the protrusion 18B of the lock member 18, thereby biasing or pressing the lock member 18 into the lock position.

The stopper 19 is located at an inner surface of the second frame 16B. The stopper 19 protrudes from the inner surface of the second frame 16B toward the first frame 16A. The stopper 19 faces an opposite end portion of the flat plate portion 14B when the shutter 13 is at the closed position. The opposite end portion of the flat plate portion 14B faces the second frame 16B in the second direction when the shutter 13 is at the closed position. The opposite end portion of the flat plate portion 14B includes an engaging portion 14D. The engaging portion 14D protrudes from the opposite end portion of the flat plate portion 14B in the second direction toward the second frame 16B when the shutter 13 is at the closed position. The stopper 19 faces and contacts the engaging portion 14D. The stopper 19 thus prevents the protrusion 14 from rotating in a particular direction when the shutter 13 is at the closed position. The particular direction is opposite to a rotating direction of the protrusion 14 when the shutter 13 moves from the closed position to the open position. The engaging portion 14D of the protrusion 14 contacts the stopper 19, so that the rotation of the protrusion 14 in the particular direction may be prevented when the shutter 13 is at the closed position.

2.5 Second Protrusion 22

As depicted in FIG. 1, the toner cartridge 1 includes a gear cover 21 and a second protrusion 22.

The gear cover 21 is located opposite to the first cover 12 in the first direction relative to the casing 2. The gear cover 21 covers at least a portion of the gear 23.

The second protrusion 22 is located opposite to the first toner chamber 2A in the first direction relative to the gear 23. The second protrusion 22 protrudes from the gear cover 21 in the first direction. The second protrusion 22 extends in the second direction.

2.6 Gear Portions and Protrusions

As depicted in FIGS. 1 and 4, the toner cartridge 1 includes gear portions 24A and 24B, protrusions 25A and 25B, protrusions 26A and 26B. Those components 24A-26B are configured to move a developing shutter 51 (described below) of the developing unit 31.

The gear portions 24A and 24B are provided at the first cover 12. In short, the first cover 12 includes the gear portions 24A and 24B. The gear portion 24A is spaced from the gear portion 24B in the first direction. The second opening 12A is provided between the gear portions 24A and 24B. Each of the gear portions 24A and 24B includes a plurality of gear teeth. In short, the first cover 12 includes a plurality of gear teeth. Each of the gear portions 24A and 24B has gear teeth at a portion of a peripheral surface of the first cover 12 along a rotating direction of the first cover 12 relative to the shutter 13. In each of the gear portions 24A and 24B, gear teeth are arranged in the rotating direction of the first cover 12 relative to the shutter 13.

The protrusions 25A and 25B are provided at the first cover 12. In short, the first cover 12 includes the protrusions 25A and 25B. The protrusion 25A is spaced from the protrusion 25B in the first direction. The protrusion 25A is aligned with the gear teeth of the gear portion 24A in the rotating direction of the first cover 12 relative to the shutter 13. The protrusion 25A is located upstream of the gear teeth of the gear portion 24A in a rotating direction R of the first cover 12. The first cover 12 rotates in the direction R when the casing 2 rotates or pivots from the second position (refer to FIG. 21) to the first position (refer to FIG. 11). The protrusion 25A is aligned with the gear teeth of the gear portion 24A in the rotating direction R with a longer distance from an adjacent tooth of the gear portion 24A than a distance between two adjacent gear teeth of the gear portion 24A. The protrusion 25B is aligned with the gear teeth of the gear portion 24B in the rotating direction of the first cover 12 relative to the shutter 13. The protrusion 25B is located upstream of the gear teeth of the gear portion 24B in the rotating direction R. The protrusion 25B is aligned with the gear teeth of the gear portion 24B in the rotating direction R with a longer distance from an adjacent tooth of the gear portion 24B than a distance between two adjacent gear teeth of the gear portion 24B. Each of the protrusions 25A and 25B protrudes in the second direction opposite to the second toner chamber 2B with respect to the first toner chamber 2A.

The protrusion 26A is located opposite to the second opening 12A in the first direction relative to the protrusion 25A. The protrusion 26B is located opposite to the second opening 12A in the first direction relative to the protrusion 25B. The protrusion 26A is located at the end portion of the first toner chamber 2A. The protrusion 26B is located at the opposite end portion of the second cover 15. Each of the protrusions 26A and 26B protrudes in the second direction opposite to the second toner chamber 2B with respect to the first toner chamber 2A.

3. Details of Developing Unit 31

Figure 7:
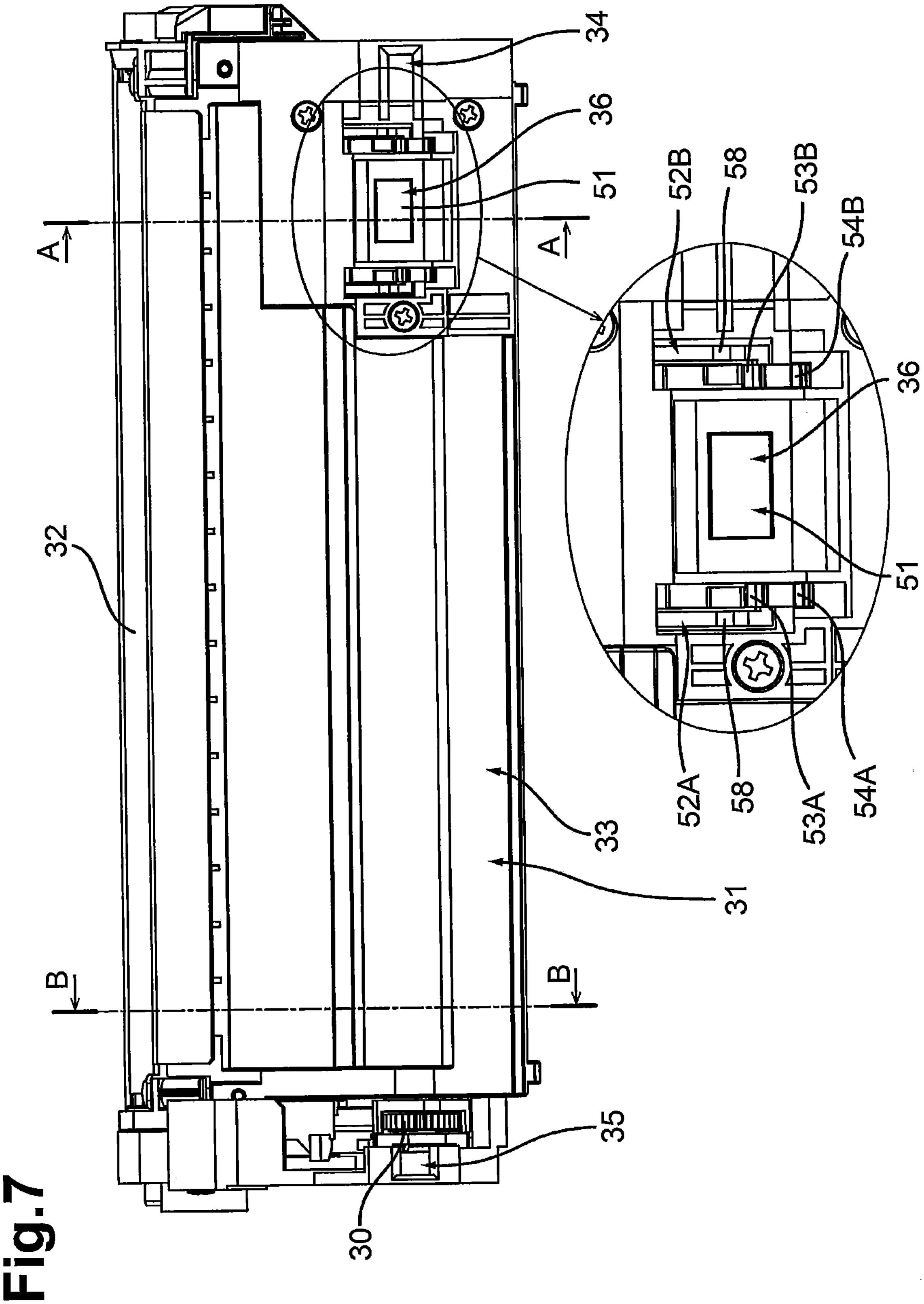
FIG. 7 is a side view of a developing unit 31 as viewed from a mounting direction of the toner cartridge 1 to the developing unit 31.
Figure 8:
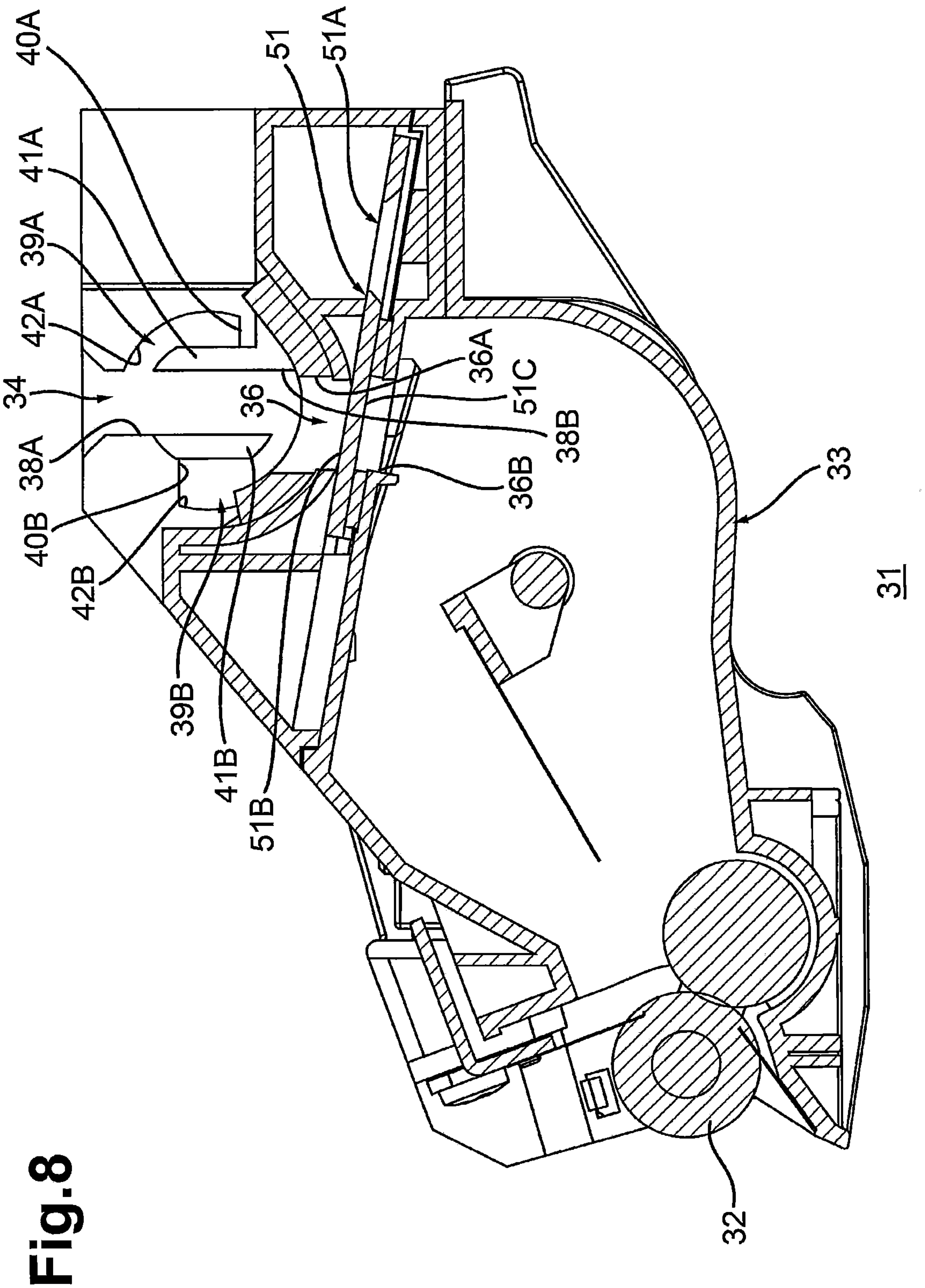
FIG. 8 is a cross-sectional view of the developing unit 31, taken along a line A-A in FIG. 7.
Figure 9:
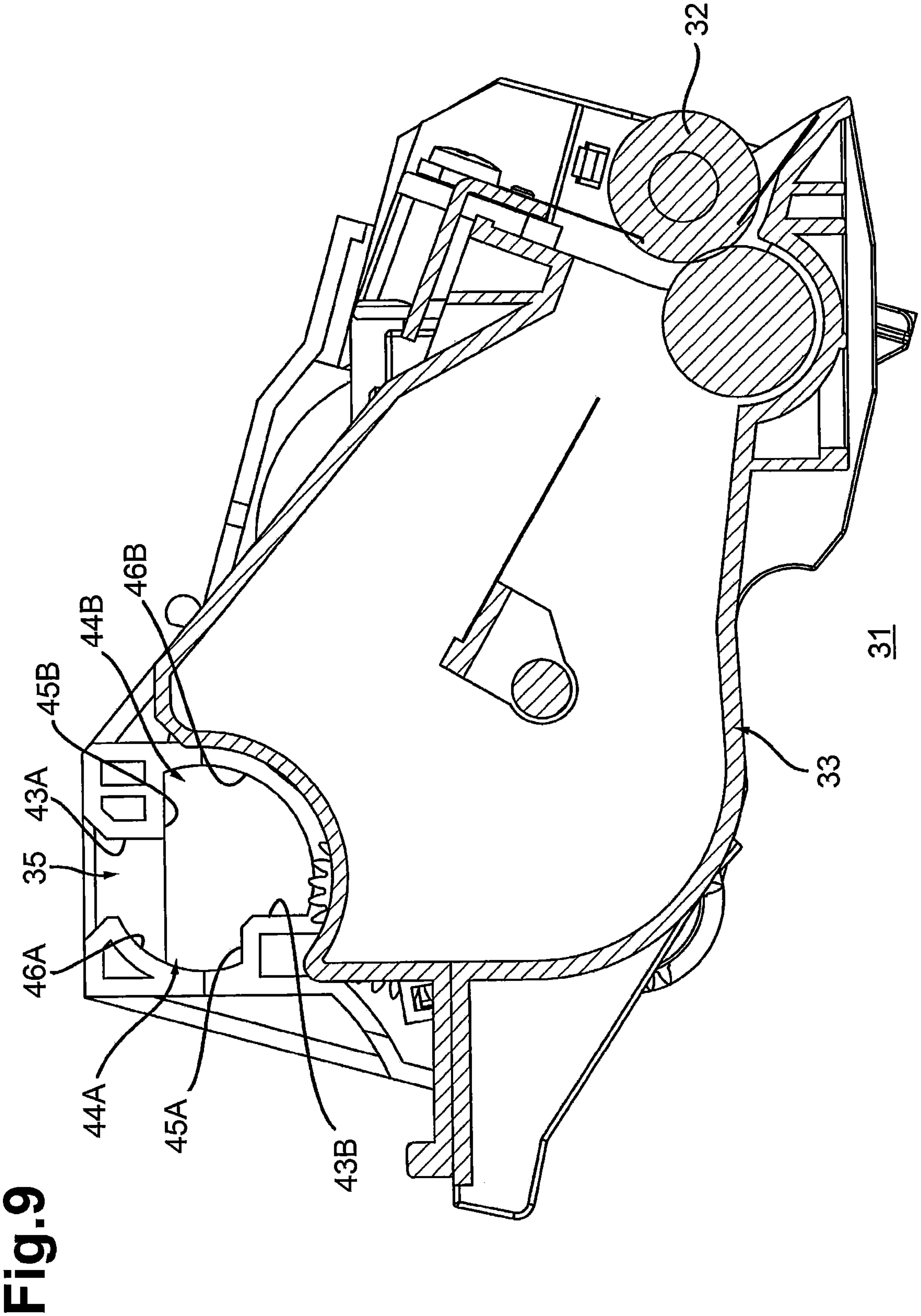
FIG. 9 is a cross-sectional view of the developing unit 31, taken along a line B-B in FIG. 7.

As depicted in FIGS. 7-9, the developing unit 31 is configured to receive the toner from the toner cartridge 1. For example, the developing unit 31 is configured to develop an image using the toner supplied from the toner cartridge 1. In the illustrative embodiment, the developing unit 31 includes a developing roller 32. The developing unit 31 may include a photosensitive member. The developing unit 31 may be configured to be attached and detached relative to an image forming apparatus. The developing roller 32 extends in the first direction. The developing roller 32 is configured to contact a photosensitive member. The developing unit 31 further includes a toner chamber 33 configured to contain toner.

The developing unit 31 has grooves 34 and 35, and a developing opening 36.

The groove 34 is provided at an end portion of the developing unit 31 in the first direction. The groove 35 is provided at an opposite end portion of the developing unit 31 in the first direction. The groove 35 is spaced from the groove 34 in the first direction. The grooves 34 and 35 are described in detail below.

3.1 Groove 34

As depicted in FIGS. 8 and 11, the groove 34 extends in a mounting direction in which the toner cartridge 1 is mounted onto the developing unit 31. The mounting direction is indicated with an arrow in FIG. 10. The groove 34 has one end portion and an opposite end portion in the mounting direction. The one end portion is further from the developing opening 36 than the opposite end portion in the mounting direction. The groove 34 has a width in a direction crossing in the mounting direction. The width is sized to receive the protrusion 14 and the cover portion 16 of the toner cartridge 1 (refer to FIG. 1). The groove 34 includes flat surfaces 38A and 38B, recessed portions 39A and 39B, and protrusions 41A and 41B.

3.1.1 Flat Surfaces 38A and 38B

The flat surface 38A is located at the one end portion of the groove 34. The flat surface 38B is located at the opposite end portion of the groove 34. Each of the flat surfaces 38A and 38B extends in the mounting direction. The flat surface 38A faces the first frame 16A (refer to FIG. 1) of the cover portion 16 when the toner cartridge 1 has been mounted on the developing unit 31. The flat surface 38B faces the second frame 16B (refer to FIG. 1) of the cover portion 16 when the toner cartridge 1 has been mounted on the developing unit 31. At least one of the flat surfaces 38A and 38B contacts the cover portion 16 when the casing 2 pivots relative to the developing unit 31 from the second position (refer to FIG. 20) to the first position (refer to FIG. 11). The flat surfaces 38A and 38B thus position the casing 2 at the first position.

3.1.2 Recessed Portions 39A and 39B

As depicted in FIGS. 8, 11, 20 and 21, the recessed portion 39A is recessed toward a direction away from the flat surface 38A in a width direction of the groove 34. The recessed portion 39B is recessed toward a direction away from the flat surface 38B in the width direction of the groove 34. The recessed portion 39A includes an arced surface 42A and a flat surface 40A. The recessed portion 39B also includes an arced surface 42B and a flat surface 40B. The arced surface 42A extends along a moving direction of the first frame 16A relative to the flat surface 38A, when the casing 2 pivots relative to the developing unit 31 from the first position to the second position. The arced surface 42B extends along the moving direction of the first frame 16A relative to the flat surface 38B, when the casing 2 pivots relative to the developing unit 31 from the first position to the second position. The flat surface 40A is disposed at a downstream end portion of the arced surface 42A in the moving direction of the first frame 16A when the casing 2 pivots relative to the developing unit 31 from the first position to the second position. The flat surface 40B is disposed at a downstream end portion of the arced surface 42B in the moving direction of the first frame 16A when the casing 2 pivots relative to the developing unit 31 from the first position to the second position. Each of the flat surfaces 40A and 40B extends in a direction crossing, e.g., orthogonal to, the mounting direction. At least one of the flat surfaces 40A and 40B contacts the cover portion 16 when the casing 2 pivots relative to the developing unit 31 from the first position to the second position. The flat surface 40A and the flat surface 40B thus position the casing 2 at the second position.

3.1.3 Protrusions 41A and 41B

The protrusion 41A and the protrusion 41B are located between the arced surface 42A and the arced surface 42B in the width direction of the groove 34. The protrusion 41A is located between the arced surface 42A and the protrusion 41B in the width direction of the groove 34. The protrusion 41B is located between the arced surface 42B and the protrusion 41A in the width direction of the groove 34. The protrusion 41B is spaced from the protrusion 41A in the width direction of the groove 34. Each of the protrusions 41A and 41B extends in the mounting direction. When the toner cartridge 1 has been mounted on the developing unit 31, the flat plate portion 14B (refer to FIG. 12) is located between the protrusions 41A and 41B. When the toner cartridge 1 has been mounted on the developing unit 31, the protrusions 41A and 41B contact the flat plate portion 14B, thereby preventing the protrusion 14 from rotating. The shutter 13 is thus fixed or positioned relative to the developing unit 31.

When the toner cartridge 1 has been mounted on the developing unit 31, the protrusions 41A and 41B do not contact the first frame 16A, the second frame 16B and the third frame 16C (refer to FIG. 1) in the width direction of the groove 34. This configuration allows the first frame 16A, the second frame 16B, and the third frame 16C to rotate relative to the shutter 13, which is fixed relative to the developing unit 31, when the toner cartridge 1 has been mounted on the developing unit 31. Accordingly, the casing 2 is allowed to pivot together with the first cover 12 and the second cover 15 relative to the developing unit 31, with the shutter 13 fixed relative to the developing unit 31. Pivoting of the casing 2 together with the covers 12 and 15 from the first position (refer to FIG. 11) to the second position (refer to FIG. 21), causes the shutter 13 to move to the open position relative to the casing 2. When the shutter 13 is at the open position (refer to FIG. 23), the third opening 13D at least partially overlaps the second opening 12A, resulting in the second opening 12A being open.

The protrusion 41A is spaced from the arced surface 42A in its radial direction. A distance between the protrusion 41A and the arced surface 42A in the radial direction is longer than a length of the first frame 16A (refer to FIG. 1) in the mounting direction. This configuration allows the first frame 16A to pass through a space between the protrusion 41A and the arced surface 42A when the casing 2 pivots relative to the developing unit 31. The protrusion 41B is spaced from the arced surface 42B in its radial direction. A distance between the protrusion 41B and the arced surface 42B in the radial direction is longer than a length of the second frame 16B (refer to FIG. 1) in the mounting direction. This configuration allows the second frame 16B to pass through a space between the protrusion 41B and the arced surface 42B when the casing 2 pivots relative to the developing unit 31.

3.2 Groove 35

As depicted in FIG. 9, the groove 35 extends in the mounting direction. The groove 35 includes one end portion and an opposite end portion in the mounting direction. The one end portion is further from the toner chamber 33 than the opposite end portion in the mounting direction. The groove 35 has a width in a direction crossing the mounting direction. The width is sized to receive the second protrusion 22 (refer to FIG. 1) of the toner cartridge 1. The groove 35 includes a flat surfaces 43A and 43B, and recessed portions 44A and 44B.

3.2.1 Flat Surfaces 43A and 43B

The flat surface 43A is located at the one end portion of the groove 35. The flat surface 43B is located at the opposite end portion of the groove 35. Each of the flat surfaces 43A and 43B extends in the mounting direction. The flat surface 43A faces an end portion of the second protrusion 22 when the toner cartridge 1 has been mounted on the developing unit 31. The flat surface 43B faces an opposite end portion of the second protrusion 22 when the toner cartridge 1 has been mounted on the developing unit 31. At least one of the flat surfaces 43A and 43B contacts the second protrusion 22 when the casing 2 pivots relative to the developing unit 31 from the second position to the first position. The flat surfaces 43A and 43B thus position the casing 2 at the first position.

3.2.2 Recessed Portions 44A and 44B

The recessed portion 44A is recessed toward a direction away from the flat surface 43A in a width direction of the groove 35. The recessed portion 44B is recessed toward a direction away from the flat surface 43B in the width direction of the groove 35. The recessed portion 44A includes an arced surface 46A and a flat surface 45A. The recessed portion 44B also includes an arced surface 46B and a flat surface 45B. The arced surface 46A extends along a moving direction of the one end portion of the second protrusion 22 relative to the flat surface 43A when the casing 2 pivots relative to the developing unit 31 from the first position to the second position. The arced surface 46B extends along a moving direction of the opposite end portion of the second protrusion 22 relative to the flat surface 43B when the casing 2 pivots relative to the developing unit 31 from the first position to the second position. The flat surface 45A is located at a downstream end of the arced surface 46A in the moving direction of the one end portion of the second protrusion 22 when the casing 2 pivots relative to the developing unit 31 from the first position to the second position. The flat surface 45B is located at a downstream end of the arced surface 46B in the moving direction of the opposite end portion of the second protrusion 22 when the casing 2 pivots relative to the developing unit 31 from the first position to the second position. Each of the flat surfaces 45A and 45B extends in a direction crossing, e.g., orthogonal to, the mounting direction. At least one of the flat surfaces 45A and 45B contacts the second protrusion 22 when the casing 2 pivots relative to the developing unit 31 from the first position to the second position. The flat surfaces 45A and 45B thus position the casing 2 at the second position.

3.3 Developing Opening 36

As depicted in FIG. 7, the developing opening 36 is provided between the grooves 34 and 35 in the first direction. The developing opening 36 is on a side closer to the groove 34 with respect to a central portion of the developing unit 31 in the first direction. As depicted in FIG. 8, the developing opening 36 extends through an outer surface of the toner chamber 33 in the mounting direction. The developing opening 36 includes one end 36A and an opposite end 36B in the mounting direction. The one end 36A is exposed to an exterior of the toner chamber 33. The opposite end 36B communicates with an interior space of the toner chamber 33.

3.4 Developing Shutter 51

As depicted in FIGS. 7 and 8, the developing unit 31 includes a developing shutter 51.

Figure 23:
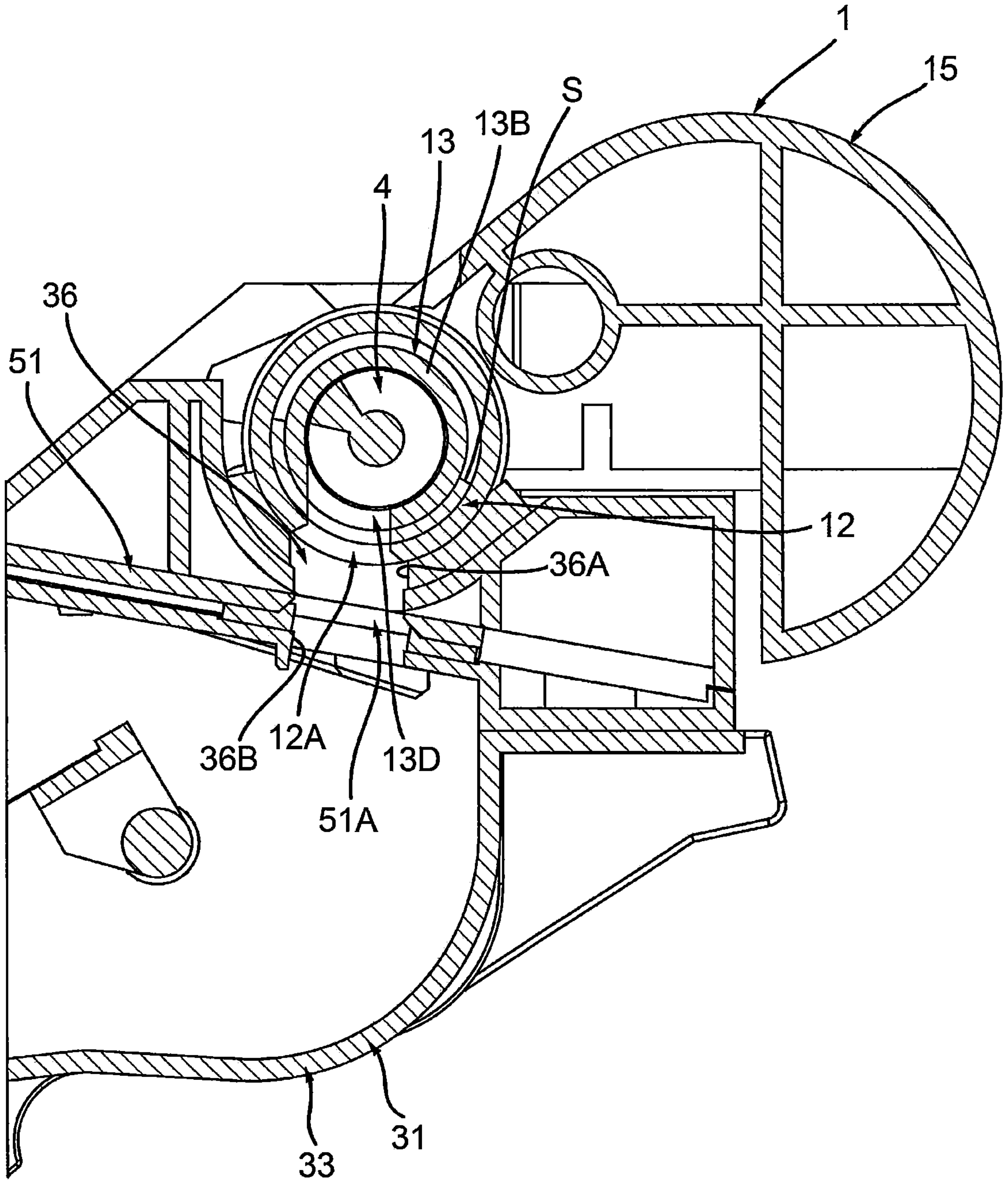
FIG. 23 is a cross-sectional view of the developing unit 31 and the toner cartridge 1 depicted in FIG. 21, taken along a line passing through the third opening 13D of the shutter 13, wherein the shutter 13 is at the open position, and the developing shutter 51 is at the open position.

The developing shutter 51 is located between the one end 36A and the opposite end 36B of the developing opening 36 in the mounting direction. The developing shutter 51 includes one side 51B and an opposite side 51C in the mounting direction. The one side 51B is closer to the one end 36A of the developing opening 36 than the opposite end of 36B in the mounting direction. The opposite side 51C is closer to the opposite end of 36B of the developing opening 36 than the one end 36A in the mounting direction. The developing shutter 51 is movable between a closed position (refer to FIG. 13) and an open position (refer to FIG. 23). At the closed position, the developing shutter 51 closes the developing opening 36. At the open position, the developing shutter 51 opens the developing opening 36. The developing shutter 51 includes an opening 51A therethrough in the mounting direction. As depicted in FIG. 23, when the developing shutter 51 is at the open position, the opening 51A at least partially overlaps the developing opening 36. This configuration allows the toner in the toner cartridge 1 to flow out into the toner chamber 33 via the developing opening 36 and the opening 51A when the developing shutter 51 is at the open position.

Figure 15:
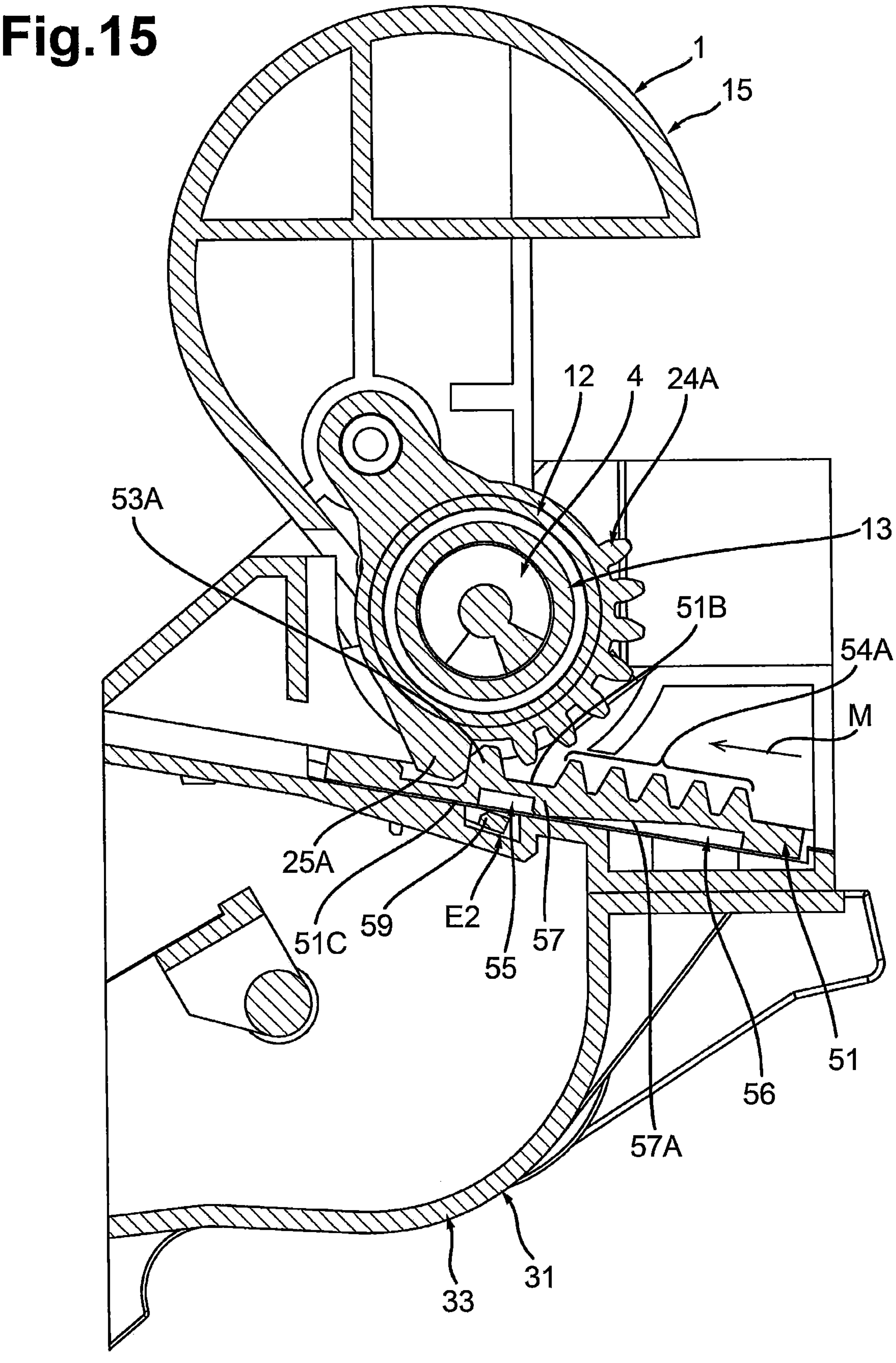
FIG. 15 is a cross-sectional view of the developing unit 31 and the toner cartridge 1 depicted in FIG. 11, taken along a line passing through a gear portion 54A of the developing shutter 51, wherein the casing 2 is in the first position, a protrusion 53A of the developing shutter 51 is between a protrusion 25A and a gear portion 24A of the toner cartridge 1.

As depicted in FIGS. 7 and 15, the developing shutter 51 includes protrusions 53A and 53B, and gear portions 54A and 54B.

The protrusion 53A is configured to contact the gear portion 24A (refer to FIG. 17) when the toner cartridge 1 has been mounted on the developing unit 31 and the casing 2 pivots relative to the developing unit 31 from the first position to the second position. The protrusion 53B is configured to contact the gear portion 24B (refer to FIG. 1) when the toner cartridge 1 has been mounted on the developing unit 31 and the casing 2 pivots relative to the developing unit 31 from the first position to the second position. When the casing 2 pivots from the first position to the second position relative to the developing unit 31, a first gear tooth of the gear portion 24A including a plurality of gear teeth pushes the protrusion 53A, and a first gear tooth of the gear portion 24B including a plurality of gear teeth also pushes the protrusion 53B. This causes the developing shutter 51 to start moving from the closed position toward the open position. The rest of the gear teeth of the gear portion 24A engage the gear portion 54A, and the rest of the gear teeth of the gear portion 24B also engage the gear portion 54B. The protrusion 53A is configured to contact the protrusion 25A (refer to FIG. 15) when the casing 2 pivots relative to the developing unit 31 from the second position to the first position. The protrusion 53B is configured to contact the protrusion 25B (refer to FIG. 1) when the casing 2 pivots relative to the developing unit 31 from the second position to the first position. When the casing 2 pivots relative to the developing unit 31 from the second position to the first position, the gear portion 24A disengages from the gear portion 54A, and the gear portion 24B disengages from the gear portion 54B. Thereafter, the protrusion 25A pushes the protrusion 53A, and the protrusion 25B pushes the protrusion 53B, thereby locating the developing shutter 51 at the closed position. The gear portion 54A is configured to engage the gear portion 24A (refer to FIG. 19) of the toner cartridge 1 when the toner cartridge 1 has been mounted on the developing unit 31. The gear portion 54B is configured to engage the gear portion 24B (refer to FIG. 1) of the toner cartridge 1 when the toner cartridge 1 has been mounted on the developing unit 31.

The protrusion 53A is located opposite to the groove 34 relative to the developing opening 36 in the first direction. The protrusion 53B is located between the developing opening 36 and the groove 34 in the first direction. Each of the protrusions 53A and 53B is located at and protrudes from the one side 51B of the developing shutter 51. The protrusion 53A and the protrusion 53B are exposed to the exterior of the toner chamber 33 when the developing shutter 51 is at the closed position.

The gear portion 54A is located upstream of the protrusion 53A in a moving direction M of the developing shutter 51 from the closed position to the open position. The gear portion 54A is spaced from the protrusion 53A in the moving direction M. The gear portion 54B is located upstream of the protrusion 53B in the moving direction M. The gear portion 54B is spaced from the protrusion 53B in the moving direction M. Each of the gear portions 54A and 54B includes a plurality of gear teeth. The gear teeth align along the moving direction M.

As depicted in FIGS. 15, 17, 19 and 22, the developing shutter 51 includes a recessed portion 55, another recessed portion 56, and a protrusion 57. The recessed portion 55 is configured to receive a protrusion 59 (described below) when the developing unit 31 has been separated from the toner cartridge 1 and the developing shutter 51 is at the closed position. The protrusion 57 is configured to contact the protrusion 59 engaged in the recessed portion 55 when the developing shutter 51 is tried to be moved from the closed position to the open position in a state where the developing unit 31 has been separated from the toner cartridge 1. Such contact prevents the developing shutter 51 at the closed position from being moved to the open position. The recessed portion 56 is configured to receive the protrusion 59 when the developing unit 31 has been attached to the toner cartridge 1 and the developing shutter 51 is at the open position. The recessed portion 55, the recessed portion 56 and the protrusion 57 are located at the opposite side 51C of the developing shutter 51. The recessed portion 56 is located upstream of the recessed portion 55 in the moving direction M of the developing shutter 51 from the closed position to the open position. The protrusion 57 is located between the recessed portion 55 and the recessed portion 56 in the moving direction M. The recessed portion 55 is recessed into the developing shutter 51 from the opposite side 51C toward the one side 51B. The recessed portion 56 is recessed into the developing shutter 51 from the opposite side 51C toward the one side 51B. The protrusion 57 is disposed below the gear portion 54A and protrudes in a direction from the one side 51B toward the opposite side 51C. The protrusion 57 includes an inclined surface 57A that is inclined relative to the moving direction M. The inclined surface 57A is inclined from the opposite side 51C toward the one side 51B of the developing shutter 51 and extends toward a direction opposite to the moving direction M from the recessed portion 55 to the recessed portion 56.

3.5 Lock Member

As depicted in FIG. 7, the developing unit 31 includes lock members 52A and 52B.

The lock members 52A and 52B are configured to lock the developing shutter 51 in the closed position when the toner cartridge 1 is separated from the developing unit 31. The developing shutter 51 locked at the closed position is prevented from moving toward the open position from the closed position. When the developing unit 31 is in a separated state relative to the toner cartridge 1 and the developing shutter 51 is at the closed position, the lock member 52A is engaged with one end portion of the developing shutter 51 in the first direction. When the developing unit 31 is in a separated state relative to the toner cartridge 1 and the developing shutter 51 is at the closed position, the lock member 52B is engaged with an opposite end portion of the developing shutter 51 in the first direction. The opposite end portion of the developing shutter 51 in the first direction is closer to the groove 34 than the one end portion of the developing shutter 51.

The lock member 52A is located opposite to the groove 34 relative to the developing shutter 51 in the first direction. The lock member 52B is located between the developing shutter 51 and the groove 34 in the first direction. The lock member 52B is spaced from the lock member 52A in the first direction. The developing shutter 51 is located between the lock members 52A and 52B in the first direction. The lock members 52A and 52B are exposed to the exterior of the toner chamber 33. Each of the lock members 52A and 52B extends in the moving direction M of the developing shutter 51.

Figure 14:
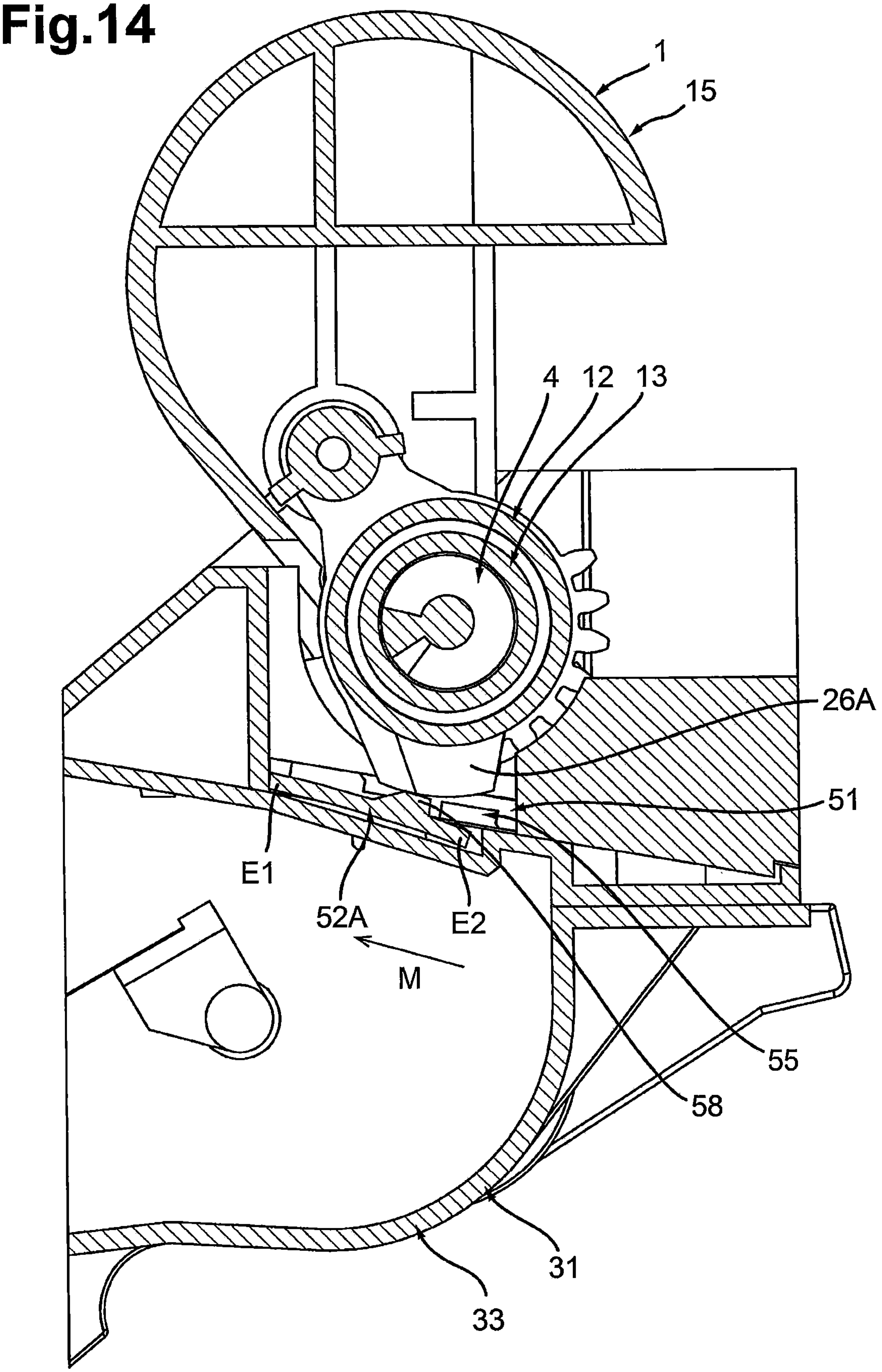
FIG. 14 is a cross-sectional view of the developing unit 31 and the toner cartridge 1 depicted in FIG. 11, taken along a line passing through a lock member 52A, wherein the casing 2 is at the first position, and a protrusion 26A of the toner cartridge 1 is in contact with a protrusion 58 of the lock member 52A.
Figure 16:
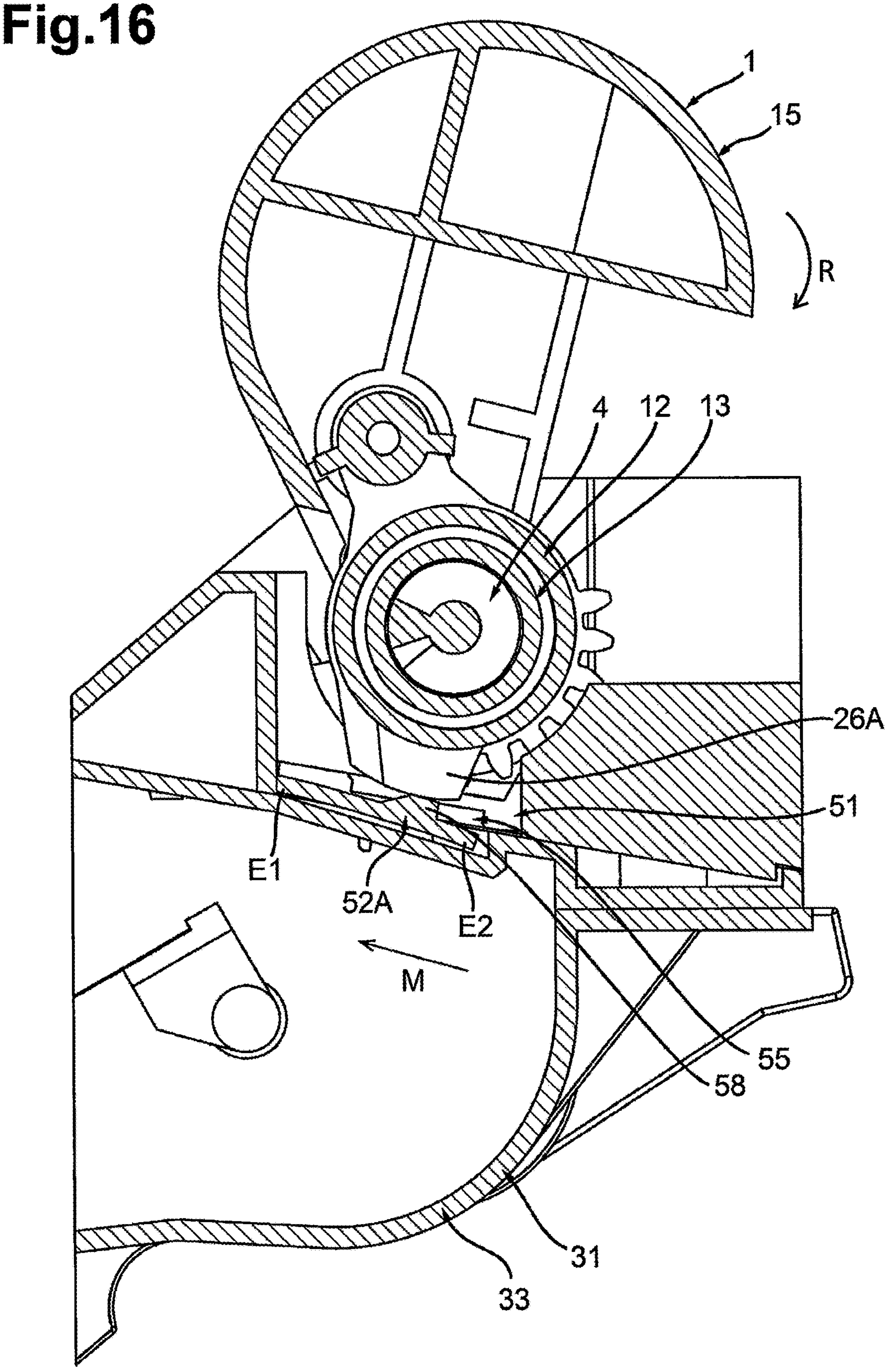
FIG. 16 is a cross-sectional view of the developing unit 31 and the toner cartridge 1, taken along a line passing through the third opening 13D of the shutter 13, wherein the casing 2 pivots relative to the developing unit 31 from the first position toward a second position, and the protrusion 26A of the toner cartridge 1 is in contact with the protrusion 58 of the lock member 52A.
Figure 18:
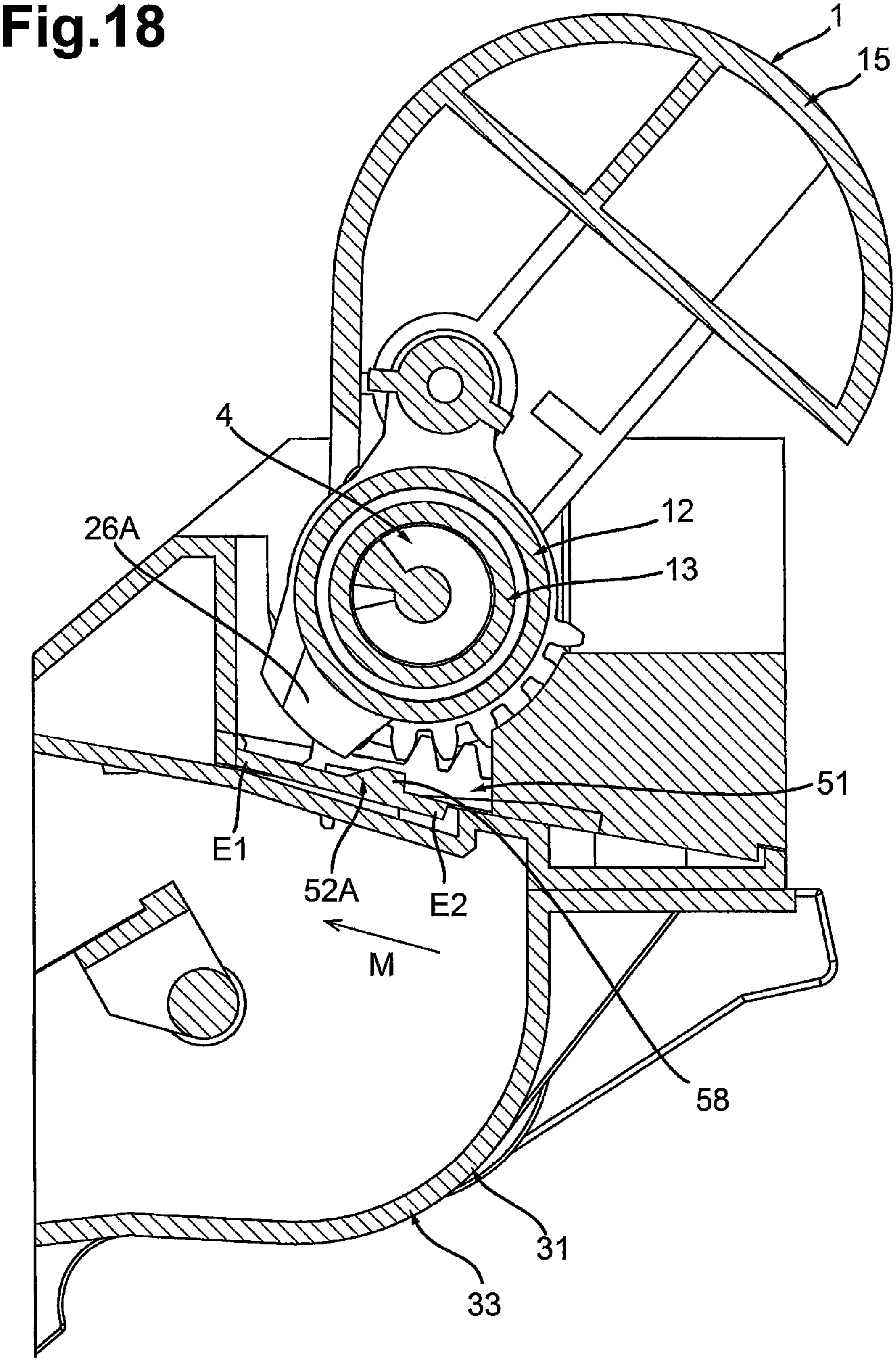
FIG. 18 is a cross-sectional view of the developing unit 31 and the toner cartridge 1, taken along a line passing through the lock member 52A, wherein the casing 2 of the toner cartridge 1 further pivots relative to the developing unit 31 from the first position toward the second position, and the protrusion 26A of the toner cartridge 1 is out of contact with the protrusion 58 of the lock member 52A.

As depicted in FIGS. 14, 16 and 18, each of the lock members 52A and 52B includes a base end portion E1 and a distal end portion E2 spaced from the base end portion E1 in the moving direction M. The distal end portion E2 is located upstream of the base end portion E1 in the moving direction M. The base end portions E1 of the lock members 52A and 52B are fixed to the developing unit 31. Each of the lock members 52A and 52B is spaced from the toner chamber 33 in the mounting direction. This configuration allows each of the lock members 52A and 52B to bend in the mounting direction. Each of the lock members 52A and 52B includes a protrusion 58 and the protrusion 59 (refer to FIG. 15).

As depicted in FIG. 7, the protrusion 58 of the lock member 52A protrudes from the lock member 52A in a direction away from the toner chamber 33 in the mounting direction. The protrusion 58 of the lock member 52B protrudes from the lock member 52B in a direction away from the toner chamber 33 in the mounting direction. The protrusion 58 of the lock member 52A is configured to contact the protrusion 26A (refer to FIG. 1) when the toner cartridge 1 has been mounted on the developing unit 31. The protrusion 58 of the lock member 52B is configured to contact the protrusion 26B (refer to FIG. 1) when the toner cartridge 1 has been mounted on the developing unit 31.

As depicted in FIGS. 15, 17, 19 and 22, the protrusion 59 of the lock member 52A is located at the distal end portion E2 of the lock member 52A. The protrusion 59 of the lock member 52B located at the distal end portion E2 of the lock member 52B. Each protrusion 59 extends in the first direction. When the developing unit 31 is in a separated state relative to the toner cartridge 1 and the developing shutter 51 is at the closed position, the protrusion 59 is engaged in the recessed portion 55 of the developing shutter 51. If the developing shutter 51 moves from the closed position toward the open position with the protrusion 59 engaged in the recessed portion 55, the protrusion 59 contacts the protrusion 57 of the shutter 51, so that the movement of the developing shutter 51 may stop.

4. Attachment and Detachment of Toner Cartridge 1 Relative to Developing Unit 31

Referring to FIGS. 10-22, operations of attaching and detaching the toner cartridge 1 relative to the developing unit 31 are now described below.

4.1 Attachment of Toner Cartridge 1 to Developing Unit 31

As depicted in FIG. 10, the toner cartridge 1 is mounted to the developing unit 31 by inserting the protrusion 14 and the cover portion 16 into the groove 34 and the second protrusion 22 into the groove 35. At this time, the casing 2 is at the first position relative to the shutter 13, as depicted in FIG. 1. The shutter 13 is at the closed position relative to the first cover 12, closing the second opening 12A. In other words, the shutter 13 closes the second opening 12A when the casing 2 is at the first position.

The toner cartridge 1 has been mounted on the developing unit 31, as depicted in FIG. 11, with the protrusion 14 and the cover portion 16 in the groove 34 and the second protrusion 22 in the groove 35. In this state, the protrusion 14 is positioned between the protrusions 41A and 41B, as depicted in FIG. 12. The protrusion 14 is thus positioned relative to the developing unit 31 when the toner cartridge 1 is fully mounted on the developing unit 31. In other words, the protrusion 14 is thus supported by the developing unit 31 when the toner cartridge 1 is fully mounted on the developing unit 31.

At this time, the protrusion 41B contacts the protrusion 18B of the lock member 18, thereby moving the lock member 18 from the lock position to the unlock position, against pressing force of the spring 18C. In other words, when the toner cartridge 1 has been mounted to the developing unit 31, the lock member 18 contacts a portion of the developing unit 31, moving from the lock position to the unlock position. The lock member 18 thus unlocks the protrusion 14 when the toner cartridge 1 has been mounted on the developing unit 31. Moving the lock member 18 from the lock position to the unlock position enables the protrusion 14 to rotate relative to the second cover 15. In other words, moving the lock member 18 from the lock position to the unlock position enables the second cover 15 to rotate relative to the protrusion 14. This configuration allows the casing 2 to pivot relative to the shutter 13, together with the first cover 12 and the second cover 15.

Figure 13:
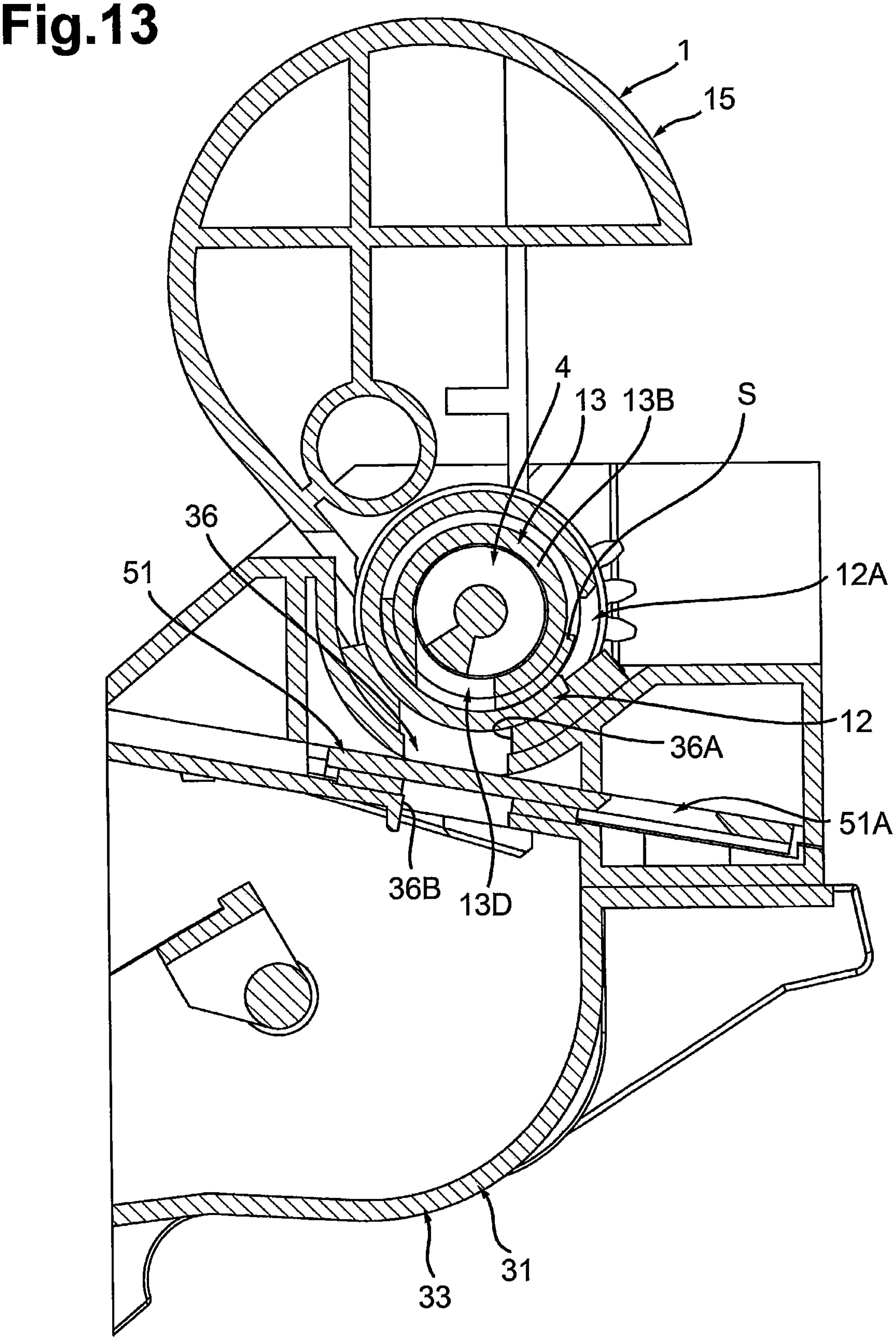
FIG. 13 is a cross-sectional view of the developing unit 31 and the toner cartridge 1 depicted in FIG. 11, taken along a line passing through a third opening 13D of the shutter 13, wherein the casing 2 is at a first position, the shutter 13 is at a closed position, and a developing shutter 51 is at a closed position.

When the toner cartridge 1 has been mounted on the developing unit 31, the developing shutter 51 is at the closed position, as depicted in FIG. 13. At this time, the protrusion 26A of the toner cartridge 1 is in contact with the protrusion 58 of the lock member 52A, as depicted in FIG. 14. Such contact may cause the distal end portion E2 of the lock member 52A to move or deflect in a direction away from the developing shutter 51, thereby disengaging the protrusion 59 of the lock member 52A from the recessed portion 55 of the developing shutter 51, as depicted in FIG. 15. At this time, the protrusion 53A of the developing shutter 51 is located between the protrusion 25A and the gear portion 24A of the toner cartridge 1.

A user may pivot the casing 2 relative to the developing unit 31, from the first position toward the second position.

Figure 17:
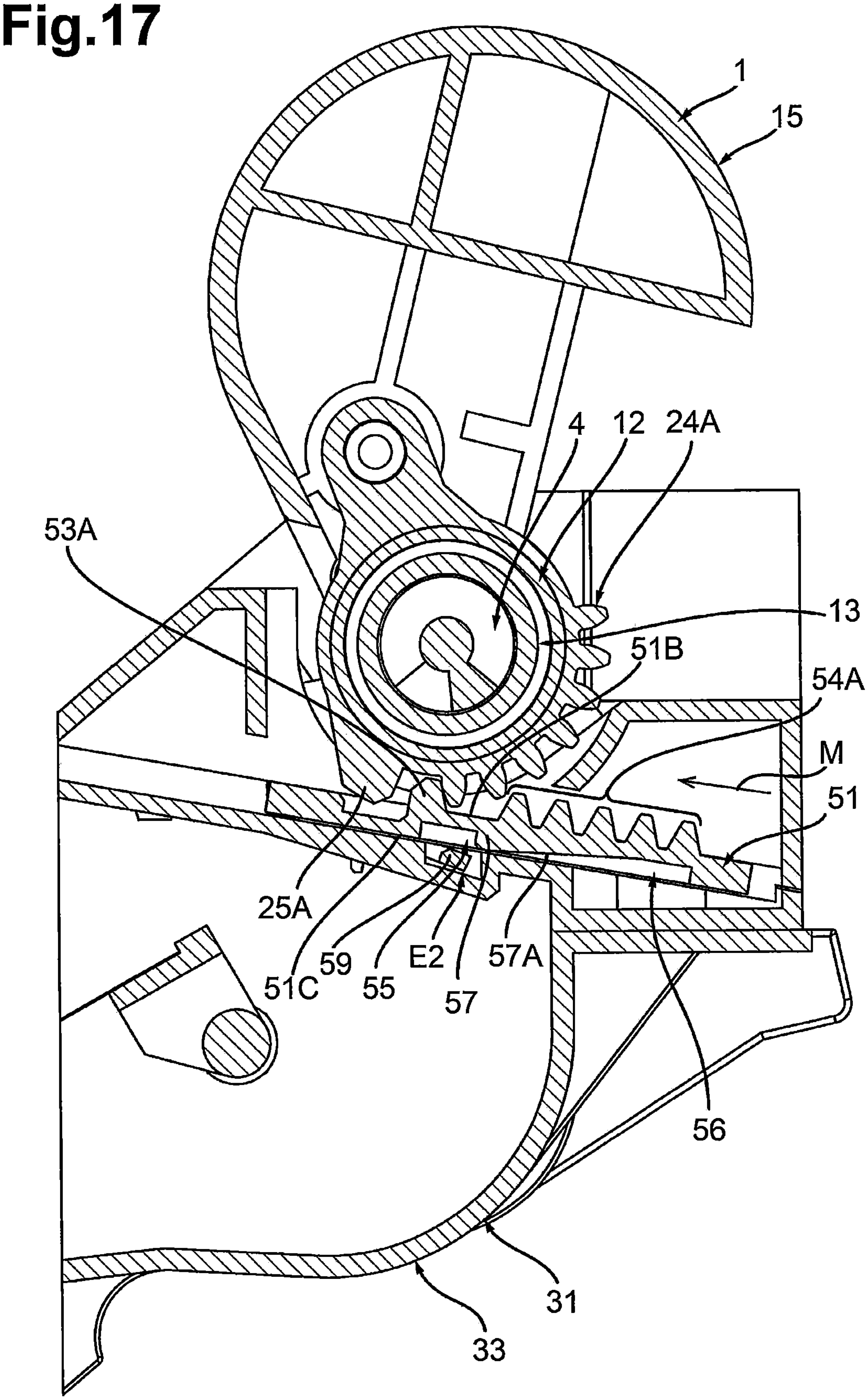
FIG. 17 is a cross-sectional view of the developing unit 31 and the toner cartridge 1 depicted in FIG. 16, taken along a line passing through the gear portion 54A of the developing shutter 51, wherein the gear portion 24A of the toner cartridge 1 is in contact with the protrusion 53A of the developing shutter 51.

During this pivoting action, as depicted in FIGS. 16 and 17, the protrusion 26A of the toner cartridge 1 contacts the protrusion 58 of the lock member 52A and the protrusion 59 is disengaged from the recessed portion 55. The pivoting action causes the gear portion 24A to press against the protrusion 53, moving the developing shutter 51 from the closed position toward the open position.

Further pivoting of the casing 2 toward the second position causes the developing shutter 51 to move further toward the open position from the closed position. The protrusion 57 passes opposite to the toner chamber 33, relative to the protrusion 59 in the vertical direction.

Figure 19:
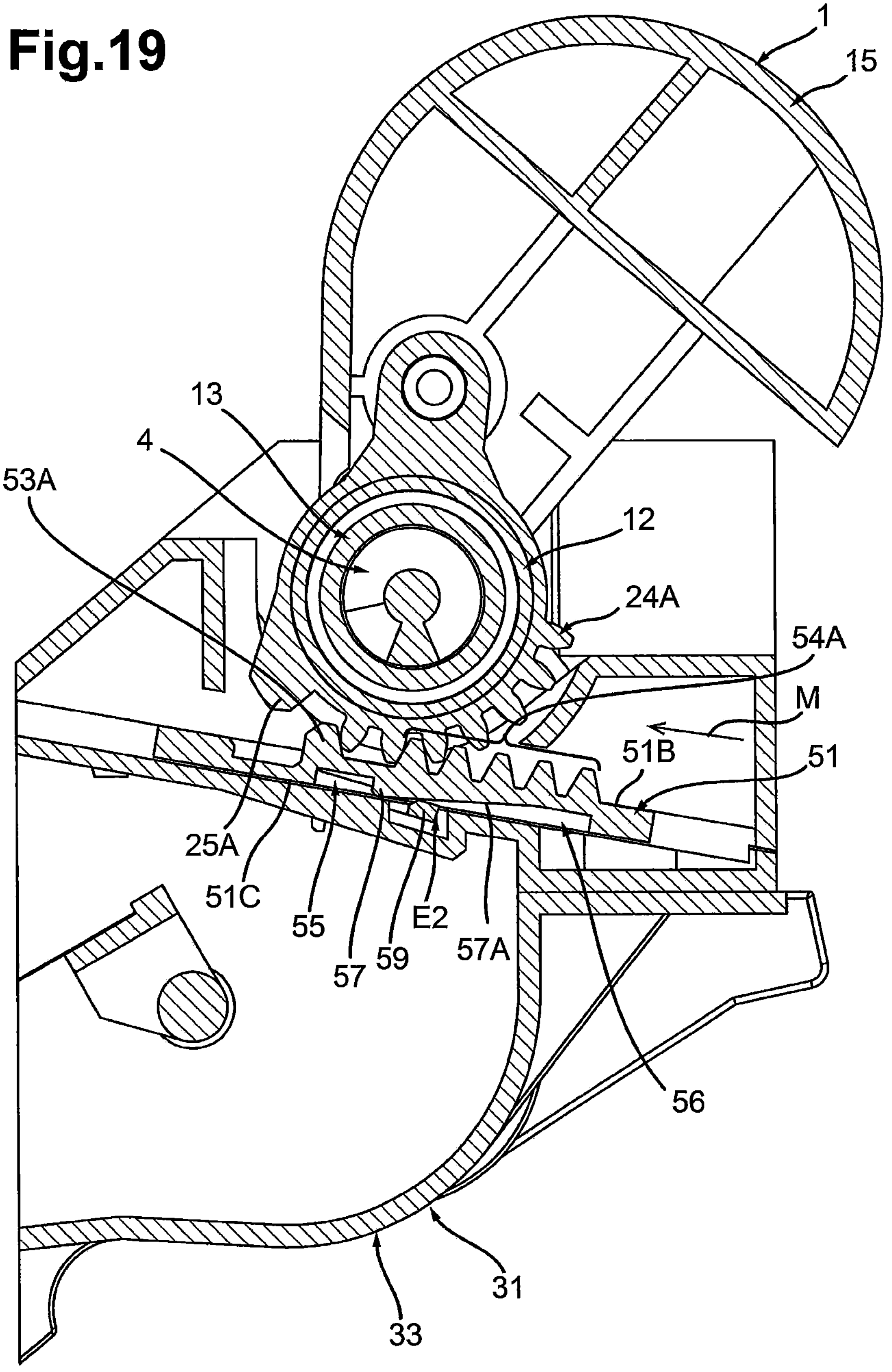
FIG. 19 is a cross-sectional view of the developing unit 31 and the toner cartridge 1 depicted in FIG. 18, taken along a line passing through the gear portion 54A of the developing shutter 51, wherein a protrusion 59 of the lock member 52A is in contact with a protrusion 57 of the developing shutter 51, and the gear portion 24A of the toner cartridge 1 is engaged with the gear portion 54A of the developing shutter 51.
Figure 20:
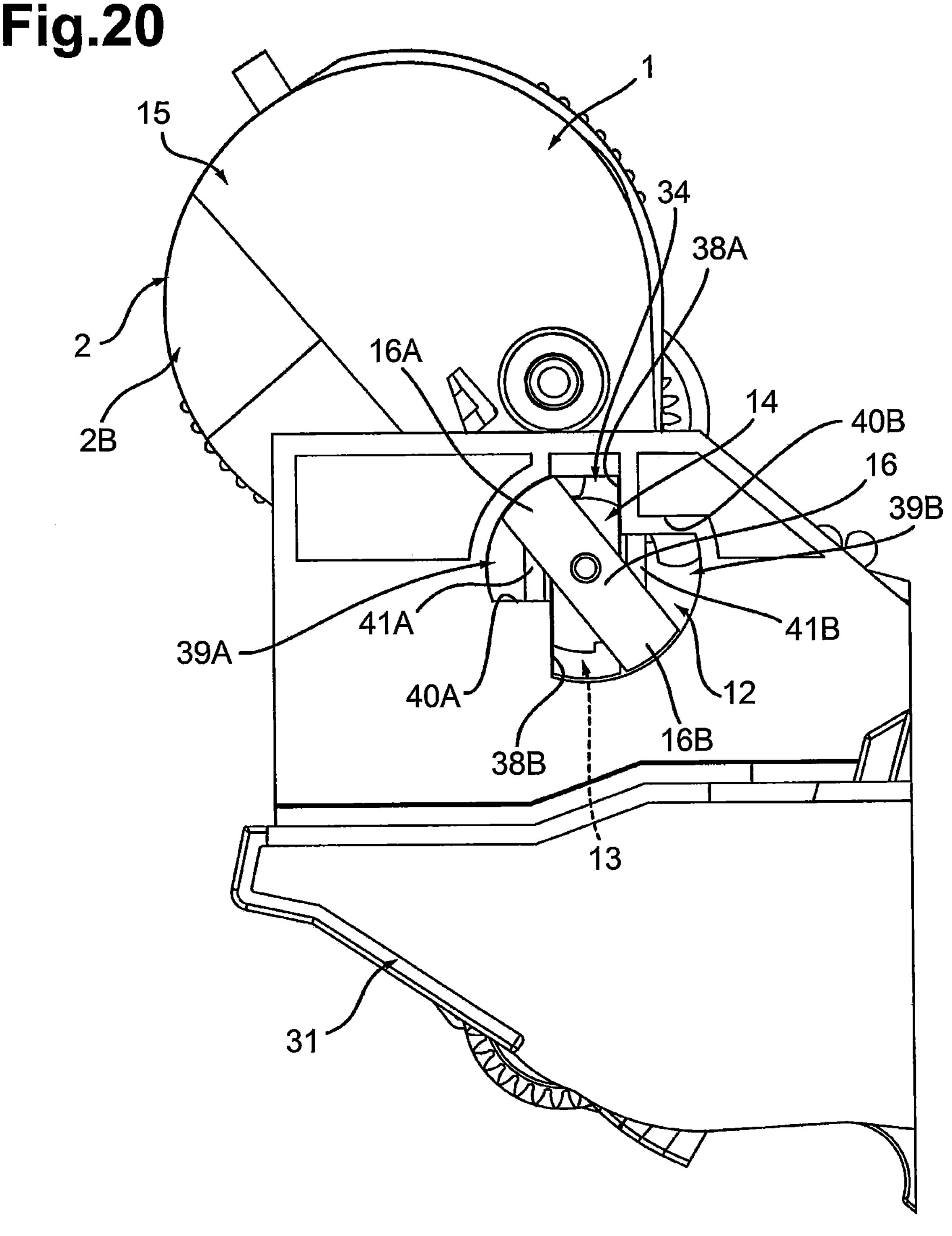
FIG. 20 is a side view of the developing unit 31 and the toner cartridge 1 depicted in FIG. 18.

During the pivoting of the casing 2, the protrusion 26A of the toner cartridge 1 becomes out of contact with the protrusion 58 of the lock member 52A, as depicted in FIG. 18. This causes the deflected lock member 52A to return to its original state and the end portion E2 of the lock member 52A to approach the developing shutter 51. Accordingly, as depicted in FIG. 19, the protrusion 59 contacts the inclined surface 57A of the protrusion 57. The gear teeth of the gear portion 24A engage the gear teeth of the gear portion 54A. In other words, at least one of the gear teeth of the gear portion 24A engages the developing shutter 51 configured to open and closed the developing opening 36 of the developing unit 31, when the toner cartridge 1 is allowed to pivot relative to the developing unit 31. During the pivoting of the casing 2, the first frame 16A of the cover portion 16 is in the recessed portion 39A of the groove 34, and the second frame 16B of the cover portion 16 in the recessed portion 39B of the groove 34, as depicted in FIG. 20.

Figure 22:
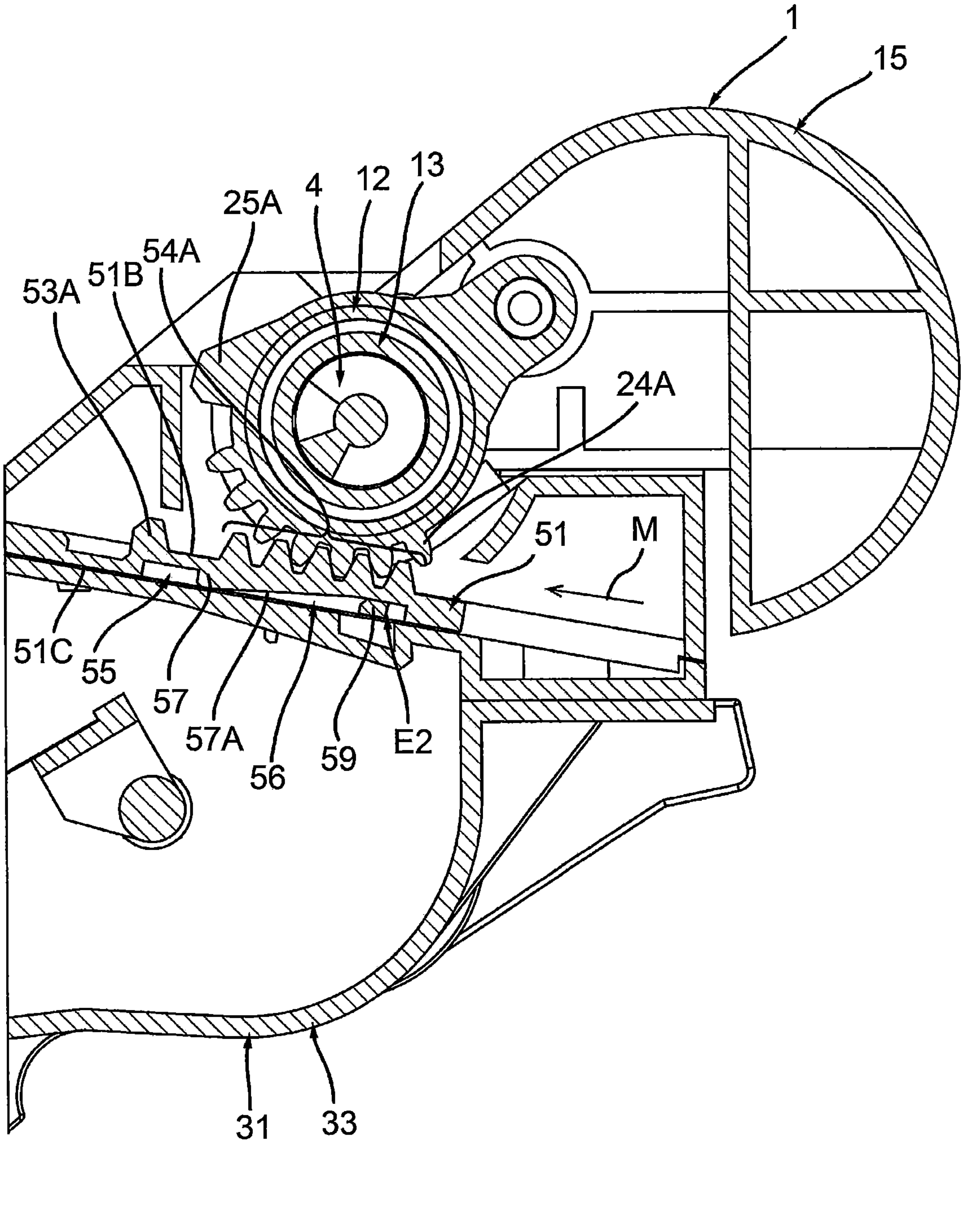
FIG. 22 is a cross-sectional view of the developing unit 31 and the toner cartridge 1 depicted in FIG. 21, taken along a line passing through the gear portion 54A of the developing shutter 51, wherein the protrusion 59 of the lock member 52A is in a recessed portion 56 of the developing shutter 51.

As depicted in FIG. 21, when at least one of the first frame 16A and the second frame 16B of the cover portion 16 contacts a corresponding one of the flat surface 40A and the flat surface 40B of the groove 34, the casing 2 is located at the second position relative to the shutter 13. At this time, as depicted in FIG. 22, the developing shutter 51 is at the open position, and the protrusion 59 is in the recessed portion 56. When the developing shutter 51 is at the open position, the shutter 13 is at the open position relative to the casing 2. The shutter 13 at the open position has the third opening 13D at least partially overlapping the second opening 12A, as depicted in FIG. 23. Accordingly, the third opening 13D allows the toner to flow out of the first cover 12 via the second opening 12A.

The toner cartridge 1 is thus attached to the developing unit 31.

4.2 Detachment of Toner Cartridge 1 from Developing Unit 31

To detach the toner cartridge 1 from the developing unit 31, a user pivots the casing 2 relative to the developing unit 31 from the second position, as depicted in FIG. 21, toward the first position, as depicted in FIG. 11.

This pivoting action causes the gear portion 24A of the toner cartridge 1 to engage the gear portion 54A of the developing shutter 51, as depicted in FIG. 19, thereby moving the developing shutter 51 from the open position toward the closed position.

During the pivoting of the casing 2, the protrusion 59 moves toward a direction away from the developing shutter 51 with respect to the second direction along the inclined surface 57A of the protrusion 57.

As depicted in FIG. 16, further pivoting of the casing 2 toward the first position causes the protrusion 26A of the toner cartridge 1 to contact the protrusion 58 of the lock member 52A. At this time, as depicted in FIG. 17, the gear portion 24A of the toner cartridge 1 disengages from the gear portion 54A. Likewise, the gear portion 24B of the toner cartridge 1 disengages from the gear portion 54B. The developing shutter 51, which is moving, temporarily stops.

Further pivoting of the casing 2 causes the protrusion 25A of the toner cartridge 1 to contact the protrusion 53A of the developing shutter 51 and the protrusion 25B of the toner cartridge 1 to contact the protrusion 53B of the developing shutter 51. The protrusion 25A presses against the protrusion 53A, and the protrusion 25B presses against the protrusion 53B. The developing shutter 51 starts to move again toward the closed position.

As depicted in FIG. 11, when at least one of the first frame 16A and the second frame 16B of the cover portion 16 contacts a corresponding one of the flat surface 38A and the flat surface 38B of the groove 34, the casing 2 is located at the first position. At this time, the developing shutter 51 is located at the closed position as depicted in FIG. 15, and the shutter 13 is located at the closed position relative to the first cover 12, as depicted in FIG. 13. At the closed position, the shutter 13 closes the second opening 12A.

The user may pull the toner cartridge 1 from the developing unit 31 in the second direction, as depicted in FIG. 10.

The toner cartridge 1 is thus detached from the developing unit 31.

5. Toner Conveyance from Toner Cartridge to Developing Unit

When the toner cartridge 1 has been attached to the developing unit 31 and the casing 2 is at the second position, the gear 23 (refer to FIG. 1) of the toner cartridge 1 is engaged with a gear 30 (refer to FIG. 7) of the developing unit 31.

Upon starting an image forming operation by an image forming apparatus, drive force is input from the gear 30 of the developing unit 31 to the gear 23 of the toner cartridge 1. The drive force causes the toner conveyance unit 4, as depicted in FIG. 2, to rotate. The drive force from the gear 23 is input to the agitator 3 via a gear train (not depicted) to rotate the agitator 3.

The rotation of the agitator 3 causes the toner in the second interior space 2E to be conveyed to the first interior space 2D.

The toner in the first interior space 2D is conveyed by the toner conveyance unit 4 to the interior space of the shutter 13, as depicted in FIG. 4.

The toner in the interior space of the shutter 13 flows out to the toner chamber 33 of the developing unit 31, via an opening defined by the third opening 13D and the second opening 12A, which overlap with each other, and another opening defined by the opening 51A of the developing shutter 51 and the developing opening 36, which overlap with each other, as depicted in FIG. 23.

6. Effects

As depicted in FIG. 11, the protrusion 14 is positioned relative to the developing unit 31 when the toner cartridge 1 has been mounted on the developing unit 31. The shutter 13 is thus fixed or positioned relative to the developing unit 31. The casing 2 is configured to pivot together with the first cover 12 relative to the developing unit 31 between the first position and the second position. As depicted in FIG. 13, when the casing 2 is at the first position, the shutter 13 closes the second opening 12A.

Pivoting of the casing 2 relative to the developing unit 31 from the first position to the second position causes at least a portion of the third opening 13D to overlap at least a portion of the second opening 12A, as depicted in FIG. 23. This overlapping causes the third opening 13D to allow the toner to flow out of the first cover 12 via the second opening 12A.

A user, who has mounted the toner cartridge 1 to the developing unit 31, may pivot the casing 2 relative to the developing unit 31 from the first position to the second position. In response to the user's pivoting action, the second opening 12A may open. In response to pivoting back of the casing 2 relative to the developing unit 31 from the second position to the first position by a user, the second opening 12A may be closed.

Accordingly, the shutter 13 may be opened and closed in response to user's operation of attaching and detaching the toner cartridge 1 relative to the developing unit 31.

While the disclosure has been described in detail with reference to the specific embodiment thereof, this is merely an example, and various changes, arrangements and modifications may be applied therein without departing from the spirit and scope of the disclosure.

What is claimed is:

1. A toner cartridge comprising:
a casing extending in a first direction, the casing having:
a first toner chamber extending in the first direction and storing toner therein;
a second toner chamber extending in the first direction and storing toner therein, the first toner chamber and the second toner chamber being aligned in a second direction crossing the first direction; and
a first opening allowing toner to flow out of the casing;
a cover located at one end portion of the first toner chamber and covering the first opening, the cover having a second opening allowing toner to flow out of the cover, the second opening being spaced apart from the first toner chamber in the first direction; and
a shutter having a third opening, the shutter being pivotable relative to the casing between a first position and a second position,
wherein, in a state where the shutter is at the first position, the shutter closes the second opening, and
wherein, in a state where the shutter is at the second position, at least a portion of the second opening overlaps at least a portion of the third opening.

2. The toner cartridge according to claim 1,
wherein the first opening is located at one end portion of the casing in the first direction.

3. The toner cartridge according to claim 2,
wherein the shutter is located at the one end portion of the casing.

4. The toner cartridge according to claim 1, further comprising a lock member configured to lock the shutter relative to the casing.

5. The toner cartridge according to claim 4, wherein when the toner cartridge is mounted on a developing unit, the lock member unlocks the shutter relative to the casing.

6. The toner cartridge according to claim 5, wherein the lock member is movable between a lock position in which the lock member locks the shutter relative to the casing, and an unlock position in which the lock member unlocks the shutter relative to the casing, and wherein when the toner cartridge is mounted on the developing unit, the lock member moves from the lock position to the unlock position by contacting a portion of the developing unit.

7. The toner cartridge according to claim 1, wherein a length of the first toner chamber in the first direction is greater than a length of the second toner chamber in the first direction.

* * * * *